US011423037B1

(12) United States Patent
Peng et al.

(10) Patent No.: US 11,423,037 B1
(45) Date of Patent: Aug. 23, 2022

(54) POPULATING SEARCH QUERY REFORMULATIONS BASED ON CONTEXT

(71) Applicant: A9.com, Inc., Palo Alto, CA (US)

(72) Inventors: Shujin Peng, Philadelphia, PA (US); Shantanu Kumar, Newark, CA (US); Alex T. Rosalez, Mountain View, CA (US); Jennifer Anne Evans, Fremont, CA (US); Vamsi Salaka, Fremont, CA (US)

(73) Assignee: A9.com, Inc., Palo Alto, CA (US)

( * ) Notice: Subject to any disclaimer, the term of this patent is extended or adjusted under 35 U.S.C. 154(b) by 134 days.

(21) Appl. No.: 16/707,273

(22) Filed: Dec. 9, 2019

(51) Int. Cl.
*G06F 16/2457* (2019.01)
*G06F 16/9535* (2019.01)
*G06F 16/248* (2019.01)

(52) U.S. Cl.
CPC ...... *G06F 16/24578* (2019.01); *G06F 16/248* (2019.01); *G06F 16/9535* (2019.01)

(58) Field of Classification Search
CPC ........... G06F 16/24578; G06F 16/9535; G06F 16/248
See application file for complete search history.

(56) References Cited

U.S. PATENT DOCUMENTS

| 6,785,671 | B1 | 8/2004 | Bailey et al. |
| 10,706,098 | B1 | 7/2020 | Ramesh et al. |
| 2007/0266002 | A1* | 11/2007 | Chowdhury ........ G06F 16/3326 |
| 2008/0082399 | A1 | 4/2008 | Noble et al. |
| 2009/0171813 | A1 | 7/2009 | Byrne et al. |
| 2013/0060761 | A1 | 3/2013 | Hoad et al. |
| 2014/0358910 | A1* | 12/2014 | Frigon ................ G06F 16/9038 707/723 |
| 2015/0339756 | A1 | 11/2015 | Konik et al. |
| 2016/0086240 | A1 | 3/2016 | Musgrove et al. |
| 2019/0155929 | A1 | 5/2019 | Kapoor et al. |
| 2020/0089809 | A1 | 3/2020 | Goenka et al. |

OTHER PUBLICATIONS

Restriction Requirement issued in U.S. Appl. No. 16/707,330 dated Jan. 29, 2021.
Non-Final Office Action issued in U.S. Appl. No. 16/707,330 dated Jun. 16, 2021.
Final Office Action issued in U.S. Appl. No. 16/707,330 dated Nov. 4, 2021.

* cited by examiner

*Primary Examiner* — Truong V Vo
(74) *Attorney, Agent, or Firm* — Hogan Lovells US LLP

(57) ABSTRACT

Search results are filtered using one or more rankers that evaluate a searcher intention to select items from a subset of search results. A subset of items may be provided that are responsive to a user search query. This subset of items may have one or more related properties and may be logically grouped together. A database of rankers may be evaluated and applied to the subset of items to determine items that are both relevant to the user search query and also correspond to a user intention for the search. As a result, the ranker may select and filter out certain items having one or more features that do not correspond to the user intention.

20 Claims, 14 Drawing Sheets

US 11,423,037 B1

POPULATING SEARCH QUERY REFORMULATIONS BASED ON CONTEXT

BACKGROUND

Users are increasingly utilizing electronic devices to research, locate, and obtain various types of information. For example, users may utilize a search engine to locate information about various items available for purchase through an online marketplace. Often, the user is browsing or trying to discover items for purchase, rather than looking for a particular product. As a result, users may enter broad search terms that return results with a variety of products, which may be difficult to browse. While providers offer filtering options, users may be reluctant to use the filters and/or may be overwhelmed by the number of choices. As a result, the user may navigate away from the site in search of other alternatives, even though their preferred product may be available through the marketplace.

BRIEF DESCRIPTION OF THE DRAWINGS

Various embodiments in accordance with the present disclosure will be described with reference to the drawings, in which.

DETAILED DESCRIPTION

Figure 1A:
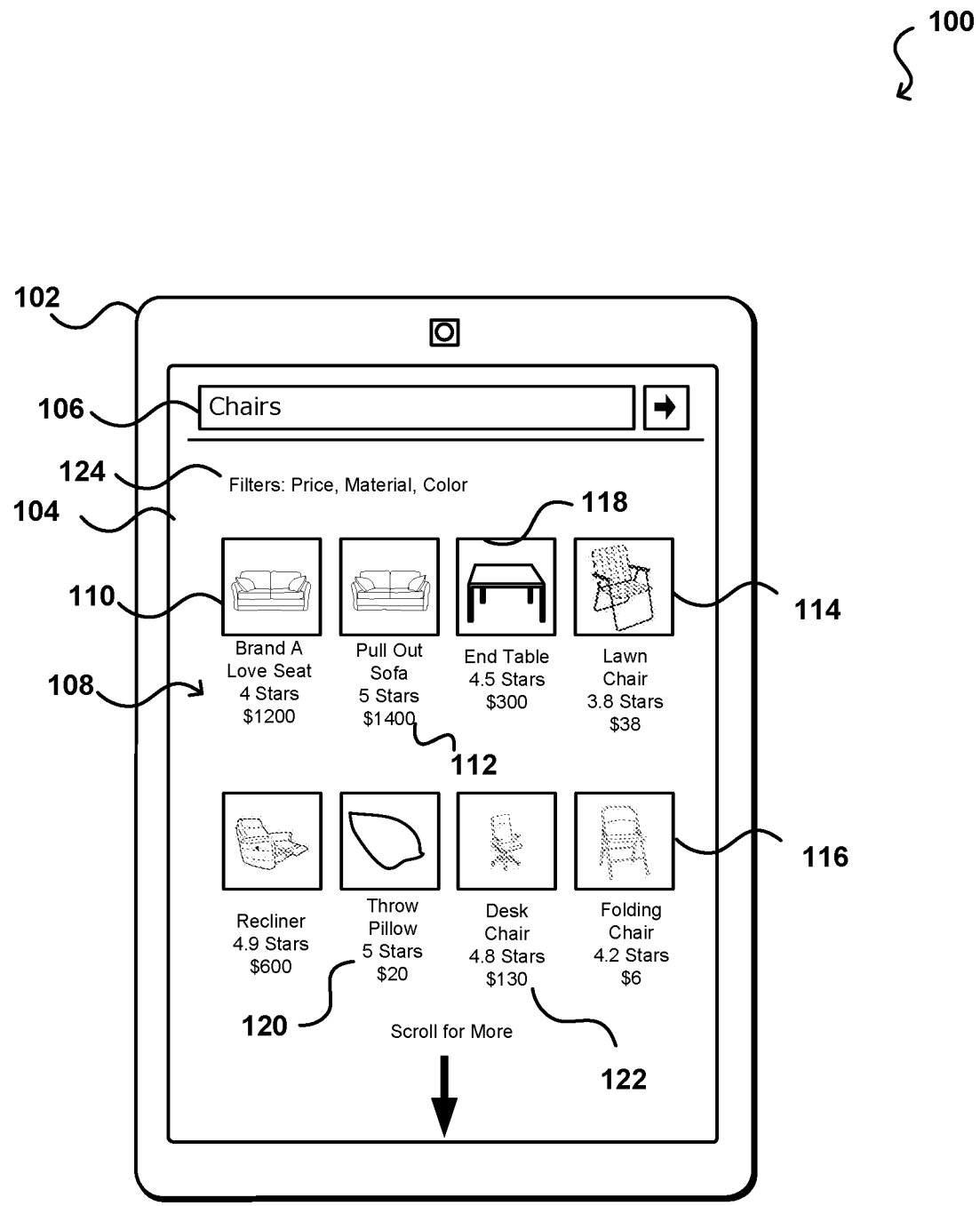
FIG. 1A illustrates an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for search and recommendation systems. In particular, various embodiments provide for logically grouping search results at a product level in response to receiving a broad search query.

For example, a user may be searching with an exploratory intent where the user may know generally what to search for, but may not provide search terms with sufficient specific to locate a particular product. Instead, the user may enter a broad search query. When searching with an online marketplace, there may have hundreds or thousands of items that satisfy a broad query. In response to the search, the provider may present products to the user based on a number of different criteria, such as popularity, price ranges, and the like. The number of options may be overwhelming for the user and may not provide an easy or convenient way to browse or otherwise search through the offerings. Accordingly, the user may either offer reformulated searches in order to eventually locate a product or may navigate to another page. Embodiments of the present disclosure are directed toward providing improved search results in response to receiving a broad query by arranging items within virtual shelves. The virtual shelves may represent a grouping of items having one or more similar features at a product level. In various embodiments, the virtual shelves may be representative of how a product is presented in a physical store, with similar items (e.g., items sharing one or more particular features) being grouped together to enable browsing by the user. In this manner, the user may be presented with different ways to browse and eventually tailor their searching to locate a desirable object.

In various embodiments, the virtual shelves may group items based on one or more features, such as brand, style, material, etc. In other words, the virtual shelves sort the items into logical groups that have one or more overlapping features. The items selected for the virtual shelves may be based on a number of different factors, such as browsing history, aggregated search statistics, popularity, search reformulations, search refinements, and the like. For example, broad queries may be evaluated for common reformulations (e.g., updated searches that add one or more additional search terms), which may guide how products are selected and grouped for the shelves. It should be appreciated that in certain instances reformulations may also be referred to as refinements, and as noted above, correspond to adjustments to search queries, such as added new text, uploading an image, or the like. By way of example, a broad query may include a search for a "dress" and a subsequent reformulation for "summer dress" (with the addition of "summer" being the reformulation) may illustrate a potential grouping or shelf (e.g., seasonal, summer, etc.). The logical groupings provided by the virtual shelves enable users to browse through different categories or types of items, even with the presentation of a broad input query, thereby providing integration into the marketplace ecosystem and an improved customer experience.

It may be desirable to sort the items within the virtual shelves such that users are presented with relevant, actionable data. In various embodiments, one or more rankers may be implemented in order to enable shelf-level searching. For example, a broad query may return hundreds or thousands of potential results, while a virtual shelf within the broad query may have fewer potential results. The rankers may provide a ranking system to facilitate search and selection through the potential items in order to present information to users. For example, the rankers may be intent-based rankers that evaluate an intent of the user and thereafter provide selection based on that intent. The intent of the user may be based on a variety of factors, such as a price point of items within the grouping, a consideration of the item (e.g., how long an average user waits to make a purchase), how often the items change (e.g., updated models), one or more features of the item, and the like. Accordingly, the items selected for the virtual shelf may include items that not only satisfy the broad query of the user's search, but that are also relevant to the user's intent.

In various embodiments, machine learning systems may be trained and deployed in order to facilitate identification and selection of items for the virtual shelves. For example, a machine learning system may be utilized to evaluate metadata associated with product identifiers, such as the Amazon Standard Identification Number (ASIN), to cluster products having one or more overlapping or complementary features. As a result, the learned clusters may provide a pool of items to select for the virtual shelves. Additionally, in embodiments, the rankers may employ one or more machine learning techniques to evaluate how items are purchased, in what quantity items are purchased, and the like in order to facilitate identification of a user's intent to select items from the group of items in the cluster.

Embodiments of the present disclosure may be directed toward systems and methods to identify logical groupings of items and to select items within these logical groupings for presentation to a user within an online marketplace. The virtual shelves may enable browsing through items, similar to a physical retail store, where like items may be grouped or arranged together. As a result, a user may enter a broad search query and be presented with multiple potential paths in order to find a desired item, similar to entering a certain "department" of a physical store and then browsing through aisles where different items are grouped onto shelves. The virtual shelves may include the logical groupings and items from the logical groupings may be selected, at least in part, based on an intent of the user and/or users that have interacted or purchased those items in the past. A variety of different factors may be utilized with shelf rankings, based on that intent, such that relevant items are presented to the user. As a result, the user experience is improved over traditional search functionality where the user is required to continuously reformulate their search query to find desirable items. Moreover, the virtual shelves provide more flexibility and diversity than deployment of standard filters, which may overly narrow products and limit the browsing performed by the user.

Various other features and application can be implemented based on, and thus practice, the above described technology and presently disclosed techniques. Various other applications, processes, and uses are presented below with respect to the various embodiments, each of which improves the operation and performance of the computing device(s) on which they are implemented.

FIG. 1A illustrates an example 100 computing device 102 providing access to an electronic marketplace 104, in accordance with various embodiments. In this example, a computing device 102 provides access to an electronic marketplace 104, in accordance with various embodiments. Although a tablet computing device is shown in this example, it should be understood that various other types of electronic devices that are capable of determining and processing input and providing output can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the elements illustrated can be part of a single device, while at least some elements illustrated and otherwise utilized for such a device can be provided as one or more peripheral devices or accessories within the scope of the various embodiments.

The illustrated electronic marketplace 104 includes a search query input 106 where a user may enter a search query. In the illustrated embodiment, the search query is a textual input "chairs." However, it should be appreciated that other media may be used in place of the text search and/or in addition to the text search. For example, images, sounds, and the like may also be incorporated into the search. In response to the search query, a list 108 of items available for purchase may be presented. These items are relevant and/or responsive to the search query. However, as illustrated in FIG. 1A the search query "chairs" may be considered a broad search query, as there are many different types of chairs. As a result, the list 108 of the results includes a variety of different options. For example, a first result 110 includes a "love seat" and a second result 112 includes a "pull out sofa." Addition results illustrated in FIG. 1A include other types of chairs, such as the "lawn chair" of the third result 114 and the "folding chair" of the fourth result 116, among others. As shown, reach result also includes information, such as an item description, a rating, and a price, although more or less information may be included.

Because the user presented a broad search query, the list 108 also includes items that, while not chairs, may be related to chairs. For example, a fifth result 118 illustrates an "end table" and a sixth result 120 illustrates a "throw pillow." This wide variety of different results may be undesirable to the user, because the user may want to browse a specific style of chair or may be searching to get ideas of what to purchase. If the user is interested in office chairs, the list 108 only includes a single "desk chair" as a seventh result 122 may lead the user to believe that additional desk chairs are unavailable or may be hard to locate. Additionally, the filtering options 124 may be insufficient to guide the users query. This may lead to user frustration.

Figure 1B:
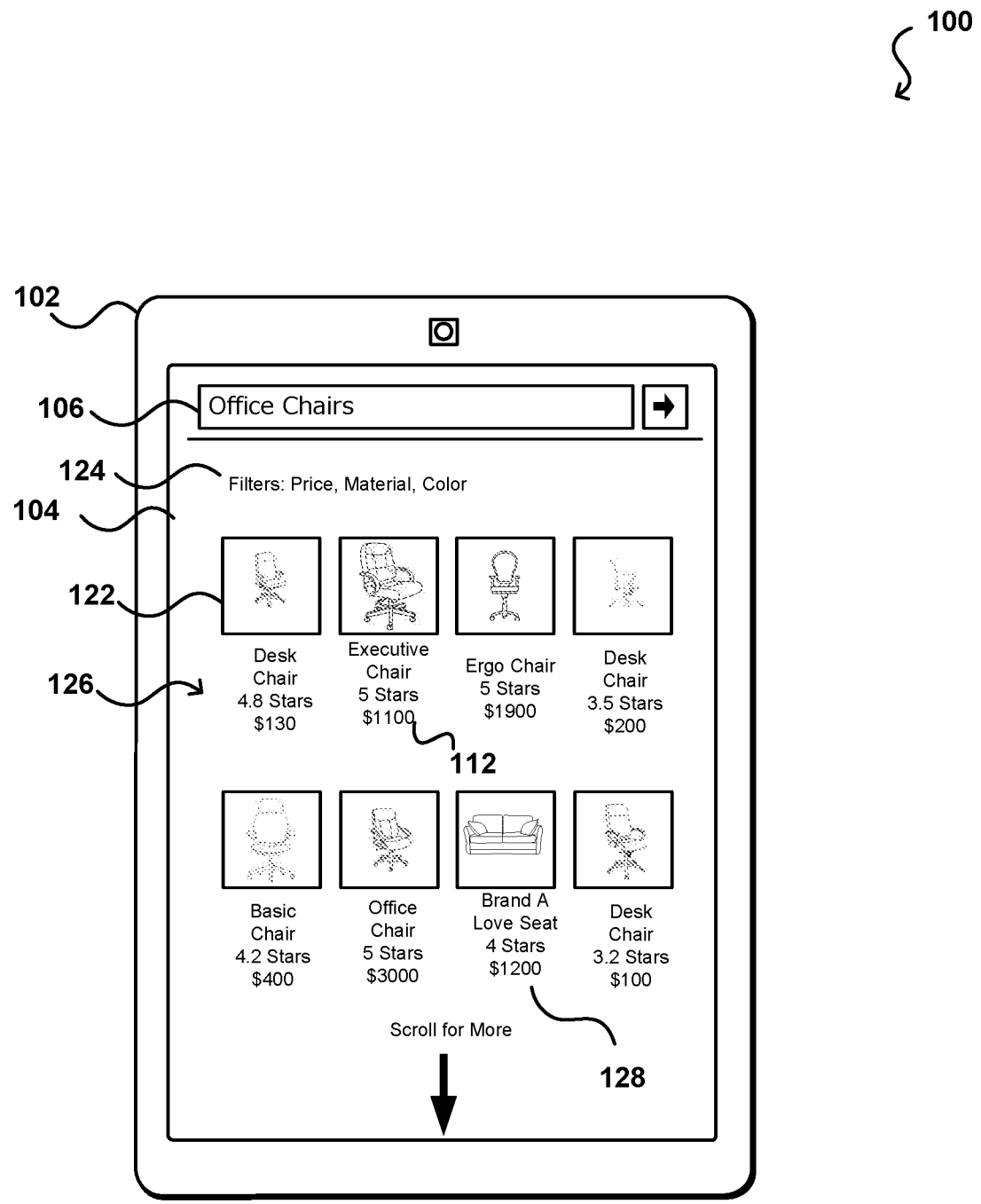
FIG. 1B illustrates an example computing device providing access to an electronic marketplace.

FIG. 1B illustrates the electronic marketplace 104 after the user has submitted a reformulated query 126 within the search query input 106, which in this instance correspond to the addition of an additional word. As shown, the reformulated query of "office chairs" has modified the search results to include chairs that may be suitable for an office. As noted above, this may be determined by one or more algorithms that may rank results based on factors such as popularity and the like. In the illustrated embodiment, the seventh result 122 remains on the list, as the "desk chair" is considered to fall within the search of "office chairs." Additionally, a second list 126 includes additional chairs that may satisfy the reformulated query. Users may be unhappy with the reformulated search and may expect that the additional office chairs would be shown with the initial inquiry. However, certain results from the second list 126 may still not be relevant or particularly directed toward the user's intent. For example, the eighth result 128 is still a couch, since many offices do include couches and other comfortable or leisure furniture.

The reformulation of FIG. 1B is enabled because the user was willing to enter the reformulated query, but such reformulations may not be available if the user is generally browsing or using the online marketplace for inspiration. In other words, present systems current provide highly relevant products when a user knows particularly what they are searching for (e.g., the system can identify and return products when it has ample guidance). However, users often are browsing for inspiration or merely "window shopping" to see if certain products identify their needs. For example, a user may generally know they want new furniture in their home, but may not know if they want new couches, a new bedroom set, or a new dining room set. A search for "furniture" may provide a variety of different items that may be deemed popular with other users (as determined by anonymized data) or that may be recommended based on advertisements or sponsored content. These results may be too generic for the user's purposes, making it difficult to identify their desired product. Embodiments of the present disclosure, however, may provide virtual shelves that include logical groupings. By way of example, the search for "furniture" may provide virtual shelves that include different groupings for "lawn furniture," "bedroom furniture," "dining room furniture," "leather furniture," and "Brand A furniture," among others. As a result, the user may browse and get ideas for purchases from the initial landing page without manually updating their search query.

In another example, the user may be searching for a particular product that may or may not include a variety of different features. For example, the user may be searching for "headphones." In a traditional retail store, the user may navigate to the electronics section, find an aisle that includes headphones, and then be presented with a variety of different headphones. Embodiments of the present disclosure may logically group the search results based on one or more features of the products, thereby enabling the user to browse without selecting particular features. For example, the search for "headphones" may return a virtual shelf that includes "BLUETOOTH® headphones," "noise cancelling headphones," "work out headphones," over the ear headphones," and "Brand A headphones," among other potential results. Now, the user can determine if a particular feature is important and then continue to browse based on the feature. Additionally, the results provide more variety than just using a predetermined filter. For example, filters may enable filtering by brand, but not by particular use, such as "work out headphones," which may be light weight, have wireless connectivity, and also include waterproof coatings, among other potential features. As a result, the logical groupings provide additional options and features included within the products and also provide additional diversity than filtering by a single, specific criteria.

Figure 2:
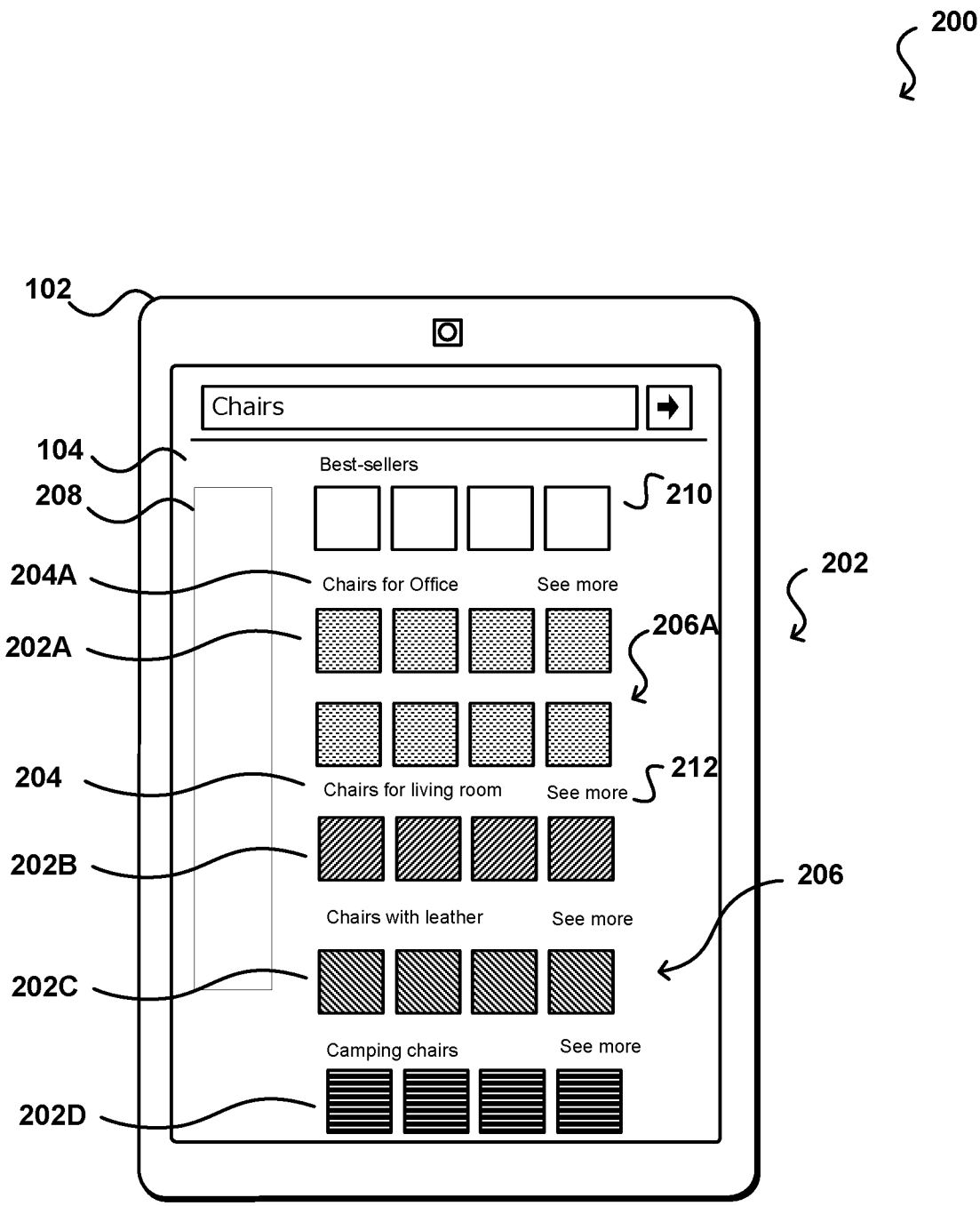
FIG. 2 illustrates an example computing device providing access to an electronic marketplace, in accordance with embodiments of the present disclosure.

FIG. 2 illustrates an example 200 computing device 102 providing access to an electronic marketplace 104, in accordance with various embodiments. In this embodiment, the electronic marketplace 104 incorporates virtual shelves 202 that provide information to users by logically grouping various products under a variety of different headings 204. It should be appreciated that the various products 206 are represented by shaded blocks for clarity with the following discussion. Additionally, particular shelves 202 or headings 204 may be delineated with an identifying letter, such as "A" or "B." The products may still include a picture of the product, product descriptions, rankings, price, and other identifying features.

In the illustrated embodiment, a filter pane 208 is included, which may enable traditional filtering, for example, by one or more specific features. Additionally, a first set of results 210 may include traditional search results, such as a list of products 206 identified by their popularity, for example. However, the virtual shelves 202 may include products that have been logically grouped by one or more features of the product and/or by one or more criteria, such as based on user search histories and the like. For example, a first shelf 202A includes the heading 204A of "Chairs for Office." As a result, the products may each include one or more features that identify them as office chairs, such as adjustable supports, wheels to enable movement, and the like. As will be described below, in certain embodiments the products 206A included within the first shelf 202A may be selected based at least in part on their popularity, their consideration rate, user browsing history, and the like.

Additional examples are provided in FIG. 2 to illustrate the diversity of options for browsing provided by the virtual shelves 202. For example, a second shelf 202B includes "Chairs for living room." This may include a mixture of sofas, love seats, recliners, and the like. Additionally, a third shelf 202C identifies the chairs by their material (e.g., leather) rather than by their location or use, further providing additional diversity and browsing options for the user. Moreover, a fourth shelf 202D identifies chairs by a different use, which may be different from the shelves. For example, there is unlikely to be much overlap between the fourth shelf 202D and the first shelf 202A because chairs for camping are likely light weight and formed from materials that can withstand the elements, rather than office chairs which may be sturdier and used within a closed, climate-controlled environment.

Accordingly, embodiments of the present disclosure utilize the virtual shelves 202 in order to break down the search results from the initial, broad, query into a number of narrower, logical groups. The groups may vary along a single dimension (e.g., style, product type, brand, occasions, etc.) or may include multiple dimensions (e.g., brand and occasion, etc.). The virtual shelves further provide additional navigation links 212 to enable the user to view additional products corresponding to that shelf. Accordingly, the user can self-navigate and continue their exploration to identify additional desired products.

It should be appreciated that the number of products 206 for each shelf may be varied and particularly selected based on one or more factors. For example, the first shelf 202A includes eight products 206 broken up into two rows of four products each. Such a configuration is for illustrative purposes only and the first shelf 202A may include more or fewer products arranged in different configurations. Moreover, the arrangement may be optimized for different displays (e.g., mobile displays, desktop displays, etc.) and may include features such as horizontal scrolling and the like in order to present additional products without fully navigating to another page via the navigation links 212. Furthermore, including four virtual shelves 202 is also for illustrative purposes only, and more or fewer shelves 202 may be generated and provided to the user in response to the search query. Moreover, it should be appreciated that various products 206 included within different shelves 202 may overlap. For example, an office chair may also be a chair with leather.

Figure 3:
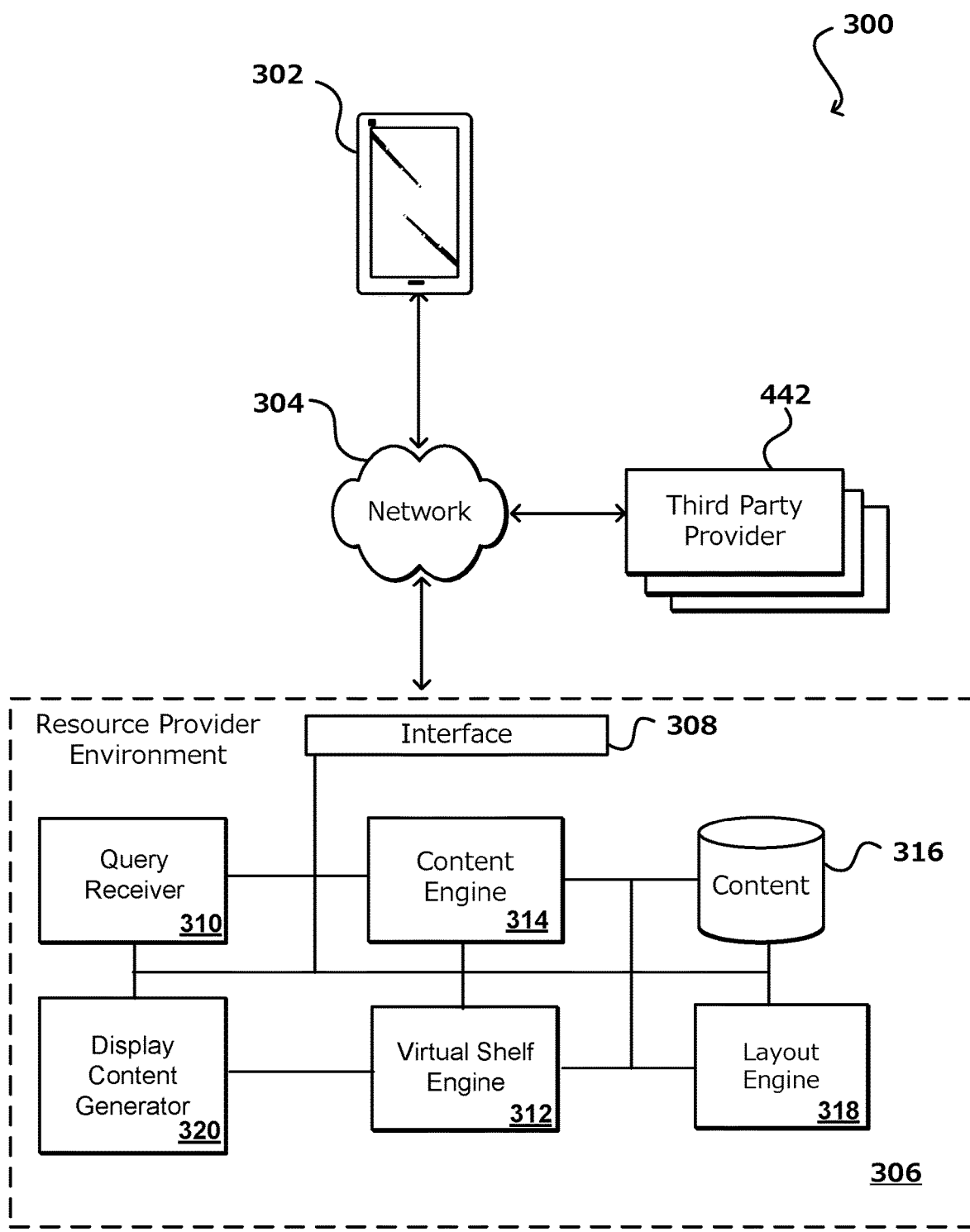
FIG. 3 illustrates an example environment in which aspects of the various embodiments can be implemented, in accordance with embodiments of the present disclosure.

FIG. 3 illustrates an example environment 300 in which aspects of the various embodiments can be implemented. Specifically, the example environment 300 includes a virtual shelf engine that can generate logical groupings of results in response to a search query. The logical groupings may be provided on a product level (e.g., displaying particular products) that are grouped by one or more similar features of the items within the groupings, such as by brand, use, material, style, and/or the like. The logical groupings making up the virtual shelves may enable a user to browse available products that are grouped together even when the user submits a broad search query that may include hundreds or thousands of potential results and classifications.

In this example, a computing device 302 is able to make a call or request across one or more networks 304 to a content provider environment 306. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud").

In this example, a request received to the content provider environment 306 can be received by an interface layer 308 of the environment. As known for network environments, the interface layer can include components such as interfaces (e.g., APIs), load balancers, request and/or data routers, and the like. In certain embodiments, the request is a search query submitted to an online marketplace, where a result is in the form of multiple media content, such as pictures, videos, text, audio, and/or the like. The request may be received at a query receiver 310. The query receiver 310 may evaluate the search query to determine whether the search query may be considered a "broad" query. In various embodiments, broad queries may be defined by click entropy, which is a mathematical calculation using historical behavior from search logs in an empirical manner. For example, a distribution of clicks over a variety of ASINs may be evaluated to compute the specificity of a query, as queries with specific intent may receive clicks on fewer ASINs than queries with broad intent. In certain embodiments, a threshold click entropy score may be defined to determine whether a search query is classified as a broad query. The query receiver 310 may have access to a database of historical click data (not illustrated), which may be separately available or integrated into the resource provider environment 310. As noted above, the historical click data may be anonymized such that identifying information for the searches is removed.

If the query is determined to be a broad query, a virtual shelf engine 312 may be utilized in order to provide virtual shelves that include logical groupings of items that may be considered relevant to the search query. For example, as described herein, the virtual shelf engine 312 may determine one or more logical groupings based on a variety of factors, such as search reformulation history, search refinement history, features of ASINs, and the like. The virtual shelf engine 312 may include a shelf generator, a shelf ranker, and a shelf-level searcher or ranker. For example, the shelf generator may evaluate search reformulation history to determine how to logically categorize the virtual shelves. Additionally, the shelf generator may also compare metadata associated with the ASINs to match and group various features. Moreover, customer reviews associated with particular ASINs may be evaluated and analyzed using natural language processing in order to extract words or phrases that may be useful in clustering and grouping particular ASINs. In certain embodiments, the shelf generator may also include one or more machine learning systems that evaluate reformulation histories and or features to cluster different ASINs in a variety of ways. By way of example only, a neural network such as a convolutional neural network (CNN) can be trained using, for example, relevant training data, such as prior reformulation history, customer reviews, and the like to cluster different ASINs and place ASINs into different groupings, which may correspond to the virtual shelves.

In various embodiments, the shelf ranker may include a ranking algorithm in order to determine an order in which items assigned to the shelf are shown and/or which shelves to present to the user and in what order. For example, the shelf ranker may rank by popularity, conversion rate, customer ratings, and the like. As noted, the virtual shelf engine 312 may also include the shelf-level searcher (e.g., ranker) which may search through items identified by the shelf generator which may evaluate a user intent to identify items for inclusion on the shelf. For example, a user may have a different intent based on a variety of factors, such as a cost of an item. It is likely that expensive items may be researched more extensively than cheaper items. As a result, items that include high rankings or a large number of reviews may be prioritized for an intent associated with purchasing an expensive item because the user may want to do additional searching before buying. In contrast, items that are purchased in bulk with a low price point may be ranked based on price or delivery times. A variety of different rankers may be developed for different types of generated shelves in order to provide diversity in options to the user. As a result, in various embodiments, the virtual shelf engine 312 may include components that provide for two different rankings. First, items are ranked on a virtual shelf such that a certain number of shelves appears on a "front page" or at first glance of the shelf. Second, a different number of shelves are ranked to determine which shelves are shown and in what order.

Once items are identified, a content engine 314 may communicate with a content database 316 in order to obtain information for display to the user, such as text, photographs, video, audio, etc. The content may include content provided by the seller, user generated content (such as user reviews), and the like. Additionally, content may include special promotions provided by the seller and/or marketplace. A layout engine 318 may be utilized, in combination with the virtual shelf engine 312, to determine presentation for the virtual shelves. For example, the layout engine 318 may evaluate what type of device made the request (e.g., a mobile device) and present a different layout to accommodate a smaller screen size or other factor associated with the user device submitting the request. In certain embodiments, different layouts may be generated based on the type of query submitted, the number of shelves generated, or the like. The layout engine 318 may determine how to present the content and transmit information to the display content generator 320 for display to the user device 302. As a result, the user may receive a response to their query.

Figure 4:
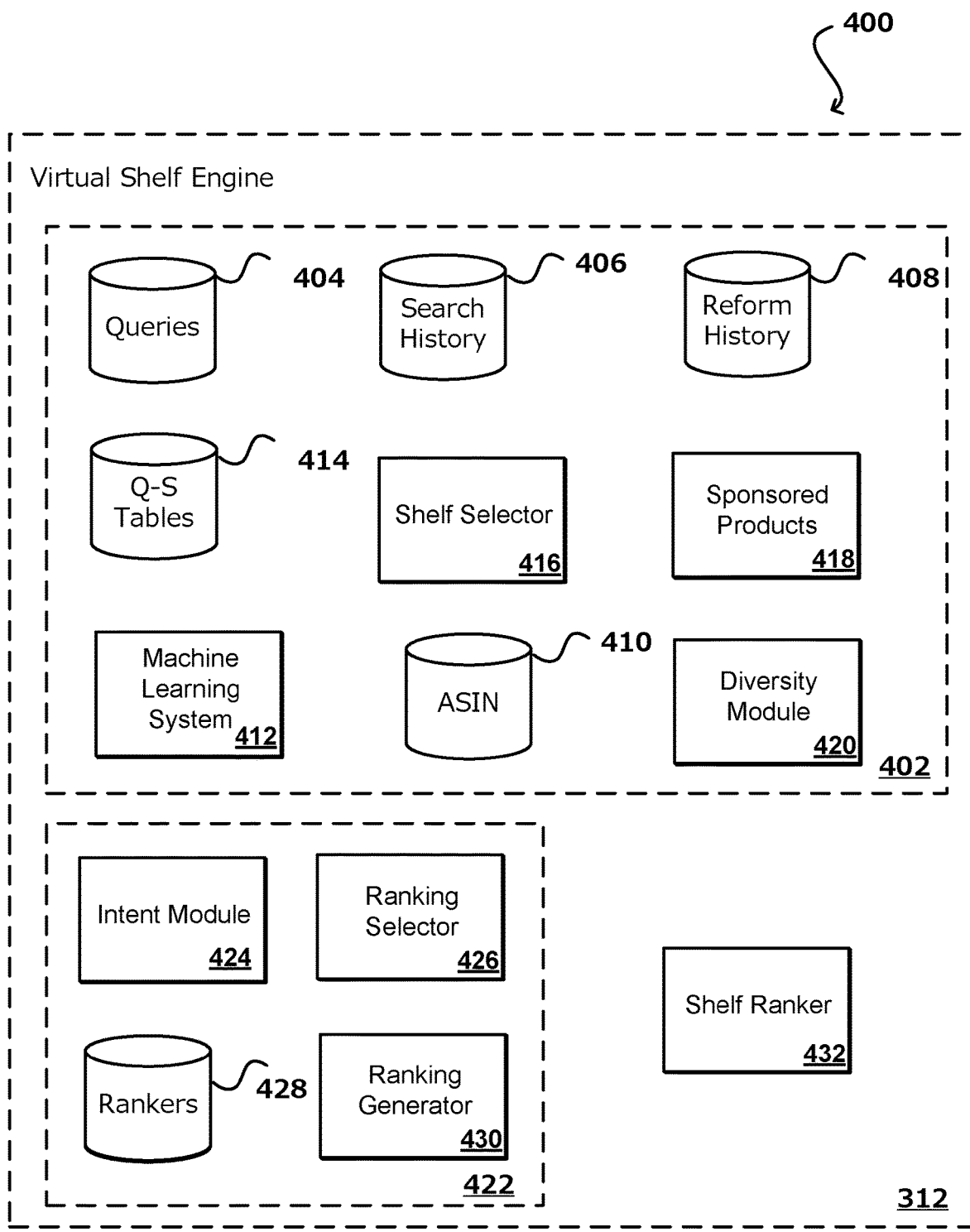
FIG. 4 illustrates an example environment in which aspects of the various embodiments can be implemented, in accordance with embodiments of the present disclosure.

FIG. 4 illustrates an example environment 400 in which aspects of the various embodiments can be implemented. The illustrated environment 400 is illustrative of the virtual shelf engine 312, including individual modules for the above-described shelf generator, shelf ranker, and shelf-level search. However, it should be appreciated that additional features may be included, either incorporated with the virtual shelf engine 312 and/or in communication with the virtual shelf engine.

The illustrated embodiment includes a virtual shelf generator 402 that may be utilized to evaluate a broad query to determine one or more virtual shelves for presentation of results in response to the query. The virtual shelf generator 402 may provide a diverse set of options for the user to review while also enabling the user to browse through a variety of different sets of products in response to receiving the broad query. For example, the user may submit a query for "headphones" and be presented with several virtual shelves including headphones that may share features (such as wireless connectivity), style (such as over the ear), brand, or the like. The virtual shelf generator 402 may receive the query from the query receiver 310, for example, after the query receiver 310 has determined that the query is a broad query, as described above. A query database 404 may be evaluated to determine whether the query has been searched before and/or is a common query where information may be made available for evaluation. For example, users may search for certain items commonly, such as "headphones" or "dresses," but less commonly for other items. If the query is present within the query database 404, search histories may be evaluated from a search history database 406. The search history database 406 may include aggregated information, which has been anonymized, to evaluate what items users are searching for within an online marketplace. In various embodiments, the search information may be categorized or otherwise grouped, for example via location or demographic information.

In various embodiments, virtual shelves may be determined, based at least in part, on user reformulations of broad search queries. For example, if a user were to search for a "chair" and then reformulate their search to an "office chair" that reformulation may be stored in a reformulation history database 408. In various embodiments, a threshold number of reformulations may be utilized to determine whether a search is a common reformulation or a representative reformulation. For example, if a certain percentage or number of sufficiently similar reformulations are identified, that reformulation may be stored within the reformulation history database 408. In various embodiments, the reformulation history database 408 is utilized, at least in part, to generate the virtual shelves. For example, common reformulations may be identified and then utilized as virtual shelves. However, it should be appreciated that other information may also be utilized to drive generation of the virtual shelves. For example, an ASIN feature database 410 may also be utilized to identify ASINs with one or more similar features, such as product capabilities, brand, color, material, and the like.

In certain embodiments, a machine learning system 412 may be used to cluster or otherwise define similarities between ASINs. The ASIN may include one or more neural networks that evaluates training data to cluster different product and/or product groups together to generate virtual shelves. The clustering, as noted above, may be based on a variety of different features and/or on search reformulations.

By way of example only, the machine learning system 412 may utilize natural language processing to evaluate customer reviews for particular ASINs. The customer reviews may provide a different level of intent for the user, which may not be present in other metadata that only correspond to product features. For example, a user may search for a book to read while relaxing by the pool. A search for "book" will likely present any number of books, many of which may not be what the user had in mind, such as a reference book. A user reformation, such as "pool book" or "poolside books" may not provide the user with relevant information because the results may be directed toward books for pool maintenance or may be directed toward the game of pool (e.g., billiards). However, embodiments of the present disclosure may evaluate customer reviews to identify unique potential clusters. A user review for a particular review may include "I loved reading this by the pool!" or "Great relaxing read at the beach." Systems and methods may identify words or phrases such as "pool" and "beach" to identify a variety of different ASINs that may be categorized as poolside books. As a result, the user's initial query for "books" may include a virtual shelf for "Poolside Books."

Embodiments of the present disclosure may evaluate a variety of different products and/or searches offline and generate potential classifications for virtual shelves, which are then applied in real or near-real time (e.g., without substantial delay). However, it should be appreciated that the generation of the shelves may also be developed in real or near-real time based on additional factors, such as user browsing history and/or the like. Additionally, the user may opt-into using the information utilized to evaluate and generate the virtual shelves. In certain embodiments, a query-shelf (Q-S) table database 414 stores tables that associate different queries with different potential shelves. For example, as will be described below, certain queries may be evaluated and reformulations and/or ASIN features or other clustering information may be utilized to generate a plurality of potential shelves. The shelves may be based on a variety of factors, as described above, such as product type, style, material, color, use case, and the like. As will be described below, upon receipt of the query and table look up, specialized rankers may be utilized to select a number of ASINs to assign to the shelves and to present to the user.

In certain embodiments, a shelf selector 416 receives information in order to select which selves from the Q-S table to utilize and present to the user. This shelf selector 416 may correspond to the second type described above, which relates to which shelves the user is presented with in response to receiving a broad query. It should be appreciated that shelf selection may be based, at least in part, by the items that are selected for inclusion on the shelf. The shelf selector 416 may also receive information from a sponsored products module 418, which may include relevant recommended items, which may be sponsored by a particular vendor. In this manner, sponsored content, which may also be relevant to the shelves, may be incorporated into the shelves along with the products identified through the reformulations.

A common problem with broad search queries is also a lack of diversity in search results. As a result, a diversity module 420 may be incorporated into embodiments of the present disclosure in order to improve and/or provide diversity in the results included within the various shelves and/or to select a diverse cross-section of potential shelves. For example, the diversity module 420 may evaluate various shelves to determine whether a cross-section is illustrated, such as including shelves for style, type, material, etc. By way of example, a user searching for "chairs" may find it beneficial to include shelves for different rooms, different materials, and different types of chairs. The diversity module 420 may, therefore, ensure that shelves from a variety of categories are included to provide sufficient options for the user. Moreover, the diversity module 420 may also evaluate the shelves to determine that a sufficient cross-section of items are included. For example, items with different price points, different rankings, and from different brands may also be advantageous for users.

As described above, in various embodiments a shelf-level searching engine 422 may also be incorporated into the virtual shelf engine 312 in order to rank and select items for inclusion within each shelf. For example, the shelf-level searching engine 422 may communicate with the shelf selector 416 in order to determine which content items to include within various shelves and/or which order to arrange the content items. The shelf-level searching engine 422 may evaluate a user's intent regarding their search when determining which items to include within a shelf. Additionally, in embodiments, intent for similar users and/or similar searches may also be utilized. In various embodiments, intent may be, at least in part, based on the particular items on the shelf. That is, features of the products included on the shelves may be indicative of the user's intent, and as a result, different rankings may be established for different products.

In one example, item consideration may be a factor in ranking the shelves. Item consideration may be defined as a measure of how likely a user is to think about and/or evaluate an item prior to purchasing the item. For example, items may be classified by how often they are purchased, how much they cost, how they function for a user, and the like. As an example, a user may purchase an oil filter for a car every few months, which may not cost a significant amount of money, and as a result may be considered a low consideration item. Another example may be plastic cups, which the user will likely use in an informal environment and may be purchasing large quantities of. This may also be a low consideration item, as one plastic cup is likely to be substantially similar to another (e.g., light weight, made from similar materials, look similar, etc.). While there may be certain differences in these products, their overall consideration may be low because a user may not spend a significant quantity of time researching or comparing these products. In contrast, a high consideration item may be a product a user purchases infrequently and that may also represent a significant monetary expenditure. For example, a user may purchase a laptop computer or patio furniture set every few years due to the cost. As a result, the user may compare several different products in order to find a product that represents a preferred mixture of features and cost.

A user intent module 424 may be used to determine the user's intent regarding the search. In various embodiments, intent may be estimated based on the search history 406. For example, conversions may be evaluated to see which items were purchased based on different search queries. Different queries and/or reformulations may display patterns that illustrate a user's intent. Moreover, as described above, different types of product and/or product features may also be indicative of intent. For example, high price items may be more likely to be high consideration items than low price items. Furthermore, high price items may also be associated with certain materials and/or brands. By way of example only, particular brands may have high price points for certain items, such as luxury goods providers. As a result, reformulations for these particular items or brands may be indicative of an intent to look at higher priced items and/or items perceived as luxury items.

A ranking selector 426 may select different rankers from a ranker database 428 for application to the shelves. The ranking selector 426 may consider the intent derived from the intent module 424 in order to select one or more specialized rankers from the ranker database 428. These specialized rankers may be applied independently and individually to one or more of the shelves. In other words, each shelf may not include items selected by the same ranker. For example, an intent indicative of purchasing a low consideration item may result in the selection of a ranker that prioritizes purchase rate. In another example, an intent indicative of purchasing a high consideration item may result in the selection of a ranker that prioritizes user reviews and/or user ratings. As a result, different shelves may be populated with items based on the intent of the user and/or likely intent based on the classification of the shelf. For example, a search for "dresses" may lead to a variety of different shelves, with one example being "evening wear" or "wedding dresses." Wedding dresses are likely to be a high consideration item, due at least in part to their cost and sentimentality applied to the purchase and use of the wedding dress. As a result, it would be advantageous to select a ranker that illustrates items with high reviews, from notable designers, or with higher price points due to the use of expensive materials. Another example may be a bicycle. The user's intent may drive the items illustrated on the shelves, as bicycles for children may have lower price points due to their reduced size and likelihood of damage, which may lead to production from sturdy materials. Additionally, colors and patterns may be important for a child's bicycle. In sharp contrast, a racing bicycle may prioritize lightweight materials, which may cost more, along with other specialized features such as racing handlebars. Accordingly, different shelves may be indicative of a different intent (e.g., a sturdy, low cost option for a child).

In various embodiments, a ranking generator 430 may be utilized to develop rankers that may be stored in the ranking database 428. In various embodiments, the ranking generator 428 may include a machine learning system that evaluates purchases, click through rate, refinements, reformulations, and/or other factors to develop rankings that may be applied to a variety of shelves. In embodiments, different intents may be a factor associated with the ranking generator 430. As an example, if a user, who has agreed to share information, is associated with a particular geographic region is looking for items that are typically associated with weather uncommon to that region, the intent module may determine that the user is shopping for a vacation. As a result, a ranking may be generated for items with quick delivery dates so that the user may obtain the item prior to their vacation. In another example, a user may be searching for particular items at the end of a season, which may provide an indication that the user is looking for end of the season sales. As a result, the intent may be to find discounted items, so the ranker may include items that have had recent price reductions. It should be appreciated that intents may also be combined. For example, the user may be looking for on sale luxury times, as a result, factors from rankers for luxury items (e.g., brand names, high cost, etc.) may be combined with factors from rankers for sale items (e.g., end of season, annual sale, etc.) in order to generate rankings to support the user intent. As a result, the user's experience in the ecosystem may be improved because less effort is required in order to find desirable items.

Further associated with the virtual shelf engine 312 is a shelf ranking module 432. The shelf ranking module may evaluate different shelves generated by the shelf generator 402 to determine which shelves to present to the user. For example, a finite number of shelves may be visible, and as a result, it may be advantageous to present shelves having a certain rank. In various embodiments, rankings may be based on relevance, conversion rate, customer rankings, click through rates, and the like. For example, the shelf ranking module 432 may evaluate how relevant a shelf is compared to the original search query. Highly relevant shelves may be presented, while shelves with low relevance may be made available after the user navigates to another page, for example, or may not be used at all. In this manner, the user is presented with a variety of different shelves, each including products that may correspond to a particular type of category, which themselves may be selected based on an intent or other factors. As a result, the user is presented with information to facilitate browsing with a variety of different factors with only the entry of a broad search query.

Figure 5A:
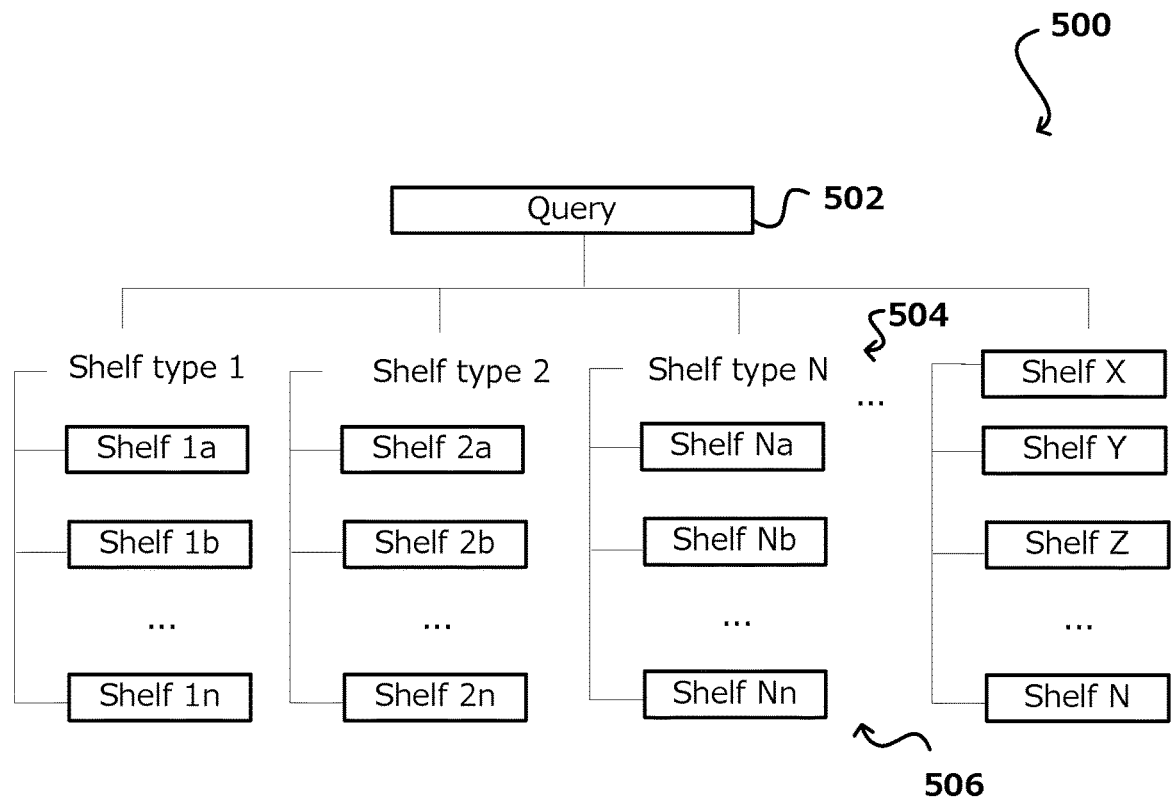
FIGS. 5A and 5B illustrate example data tables for implementing aspects of the various embodiments, in accordance with embodiments of the present disclosure.

FIG. 5A illustrates an example 500 embodiment of a Q-S table structure, which may be utilized with embodiments of the present disclosure. In the illustrated embody, a query 502 is submitted, for example, as described above. The query 502 may be a broad query, and as a result, may be processed and evaluated to determine that the query 502 corresponds to the illustrated Q-S table structure. The query 502 may include a variety of different shelf types 504, which may be arranged by a variety of different factors. In various embodiments, the shelf types 504 may be determined from search reformulations. For example, if a user searched for "headphones" and then "wireless headphones" a potential shelf type 504 may be wireless. Additionally, the reformulation may also be a shelf 506, which falls under a broader category. In the previous example, "wireless" may correspond to a shelf 506 while the shelf type 504 may correspond to a broader category, such as connection type.

The illustrated embodiment includes a plurality of shelf types 504, starting with shelf type 1 and continuing on to shelf type N, where N is an integer. Moreover, each shelf type 504 includes the shelves 506. In the illustrated embodiment, there are shelves a-n, with n representing an integer. As a result, there may be any reasonable number of different shelves 504. It should be appreciated that each shelf type 504 may not include the same number of shelves 506.

Moreover, it should be appreciated that the shelves 506 may not be grouped by shelf type. For example, in the illustrated embodiment, a variety of shelves 506 (e.g., Shelf X, Shelf Y, Shelf Z, Shelf N) are included, as a response to the query 502, which are not grouped under a shelf type 504. Accordingly, in embodiments, shelves may be provided directly without the additional layer of grouping. As will be described below, the shelves 506 may include features from the other shelves.

Figure 5B:
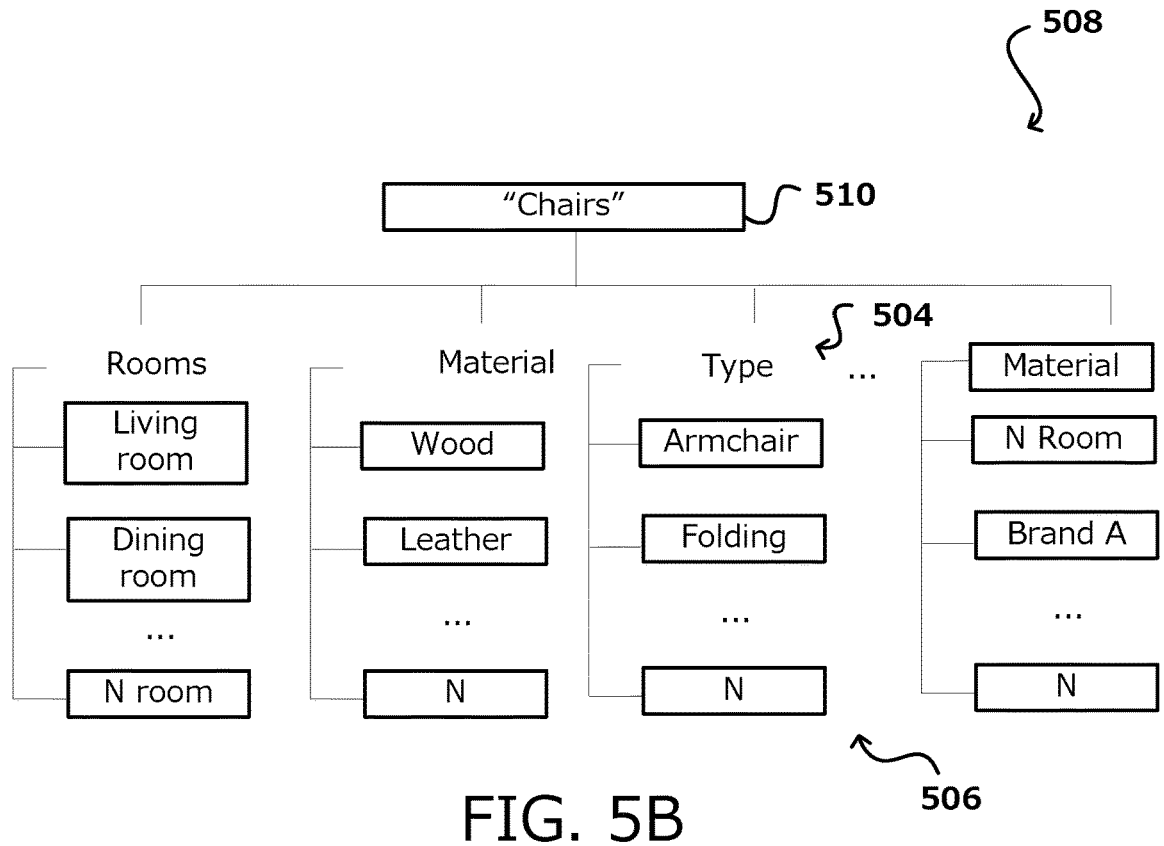

FIG. 5B illustrates an example 508 embodiment of a Q-S table structure for a query 510 equal to "chairs." The query 510 may be deemed a broad query, as there may be several different types of chairs. As noted above, broad queries may be determined, at least in part, on click entropy. In various embodiments, a reformulation database may be evaluated to determine how historical search data has reformulated a broad query, which may be utilized to generate at least one of the shelf types 504 or individual shelves 506. Additionally, in embodiments, metadata from the ASINs of products that form the shelves may be evaluated to determine overlapping or related categories that may be useful in forming shelves.

In the illustrated embodiment, three different shelf types 504 are illustrated, but it should be appreciated that there may be more or fewer shelf types 504. The example shelf types 504 correspond to "Rooms," "Material," and "Type." Rooms may refer to rooms where the chair may be located. As will be appreciated, certain types of chairs and other furniture may be more likely in a certain room of a home than another. By way of example only, the rooms illustrated in FIG. 5B include "Living room," "Dining room," and "N room," where N is a placeholder representing any other type of room. Such shelves may be determined based on the search reformulation history. For example, a threshold number of users may have first searched for "chairs" and then modified their search to "living room chair" or the like. Additionally, a second threshold number of users may have searched for "chairs" and then modified their search to "dining room chair" or the like. As a result, this number of reformulations may be evaluated and then, in this case, further grouped. For example, rather than formulating a category specifically for "living room chairs" an overlapping quality of the different reformulations was determined (e.g., room) and then reformulations associated with that overlapping quality were collected under a single shelf type 504. It should be appreciated that in various embodiments the "living room" may be a shelf type 504, with further reformulations under "living room" such as "sofa," "love seat," "sectional," and the like.

Continuing with FIG. 5B, a second shelf type 504 is illustrated as "Material" which delineates one or more materials of construction for the chairs. The example shelves include "wood," "leather," and "N," which is also a placeholder for a variety of different materials in this example. Advantageously, specifying the shelves by material may provide a wide range of different chairs, which may help the user to browse. For example, "wood" chairs may include dining room chairs, formal chairs, rocking chairs, patio chairs, and the like. Accordingly, the user may be inspired or have a diverse set of options to look through, which may facilitate location and purchase of a product. Similarly, the classification of "leather" may also provide a variety of options, such as leather sofas, leather office chairs, and the like. Once again, a diverse set of items is presented to the user, which is advantageous for a user that intends to browse.

The illustrated example further includes a third shelf type 504 illustrated as "Type" which delineates a category or type of chair. The example shelves 506 within this shelf type include "armchair," "folding," and the placeholder "N." Once again, the illustrated embodiment illustrates the diversity of results that may be presented to the user utilizing systems and methods of the present disclosure. For example, products that may be arranged on the "armchair" shelf 506 may include leather armchairs, reclining armchairs, wood arm chairs, formal armchairs, and the like. Similarly, products that may be arranged on the "folding" shelf 506 may include plastic chairs, picnic chairs, canvas chairs, patio chairs, and the like. In this manner, the user is presented with broad, product-level categories to facilitate their search and discovery with entry of a broad search query.

As noted above, in various embodiments a broad query may be evaluated to determine one or more shelf types and/or shelves that may be utilized to provide virtual shelves to a user to facilitate browsing without manual entry of reformulations. For example, a user may enter a broad search term that is evaluated and determined to have a corresponding Q-S table structure. The Q-S table structure may include one or more shelf types, which may include one or more shelves. The shelf types and/or shelves may be determined, based at least in part, on historical search information and/or evaluation of ASIN features, among other sources of information. For example, a threshold number of search reformulations may be used to determine the shelf types and/or shelves. Additionally, the reformulations may be further evaluated for similarities and grouped together, thereby forming shelves of a shelf type. In various embodiments, the shelf types may be selected and/or sorted based on a variety of factors, such as a user's search intent, a diversity criteria, or the like. For example, if a user's search intent is for low cost, low consideration items, one or more shelves may be selected to satisfy this intent, thereby providing more relevant information to the user, even without receiving additional reformulations from the user. Accordingly, improved search results are presented to the user which may be more relevant than providing search results based only on the broad search query. Moreover, the virtual shelves may provide improved search results compared to broad categorical delineations because the results may include more diversity and/or be presented based on the user's intent.

As noted above, in various embodiments, shelves 506 may be provided directly in response to the query 510 that have not been categorized or grouped as a shelf type 504. For example, in the illustrated embodiment a shelf 506 is labeled as "Material" which may include a variety of chairs that are constructed from different materials, such as leather, wood, etc. Advantageously, this may provide improved diversity over a shelf that only includes leather or only includes wood chairs. A potential shelf 506 also includes "Brand A" which may provide chairs that are associated with Brand A, but may include a variety of different types, materials, colors, etc. Accordingly, embodiments of the present disclosure may group shelves in a variety of ways and also categorize items within those shelves in a variety of ways in order to improve diversity and/or to provide a range of options for users.

Figure 6A:
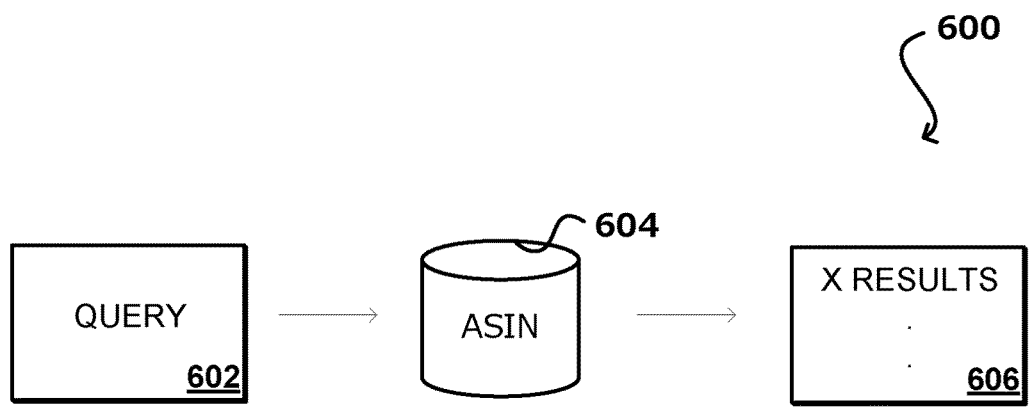
FIG. 6A illustrates an example environment for implementing a search query.

FIG. 6A illustrates an example environment 600 illustrating a traditional resource to receiving a search query 602. The query may be evaluated against a database 604 including ASINs to select one or more products that may be responsive to the search query. When the query 602 is a broad query, as noted above, the search results 606 may include X entries, which may include hundreds, thousands, or hundreds of thousands of ASINs. The sheer number of results may be overwhelming for a user and may lead to attempts at manual reformulation, which may be frustrating for the user.

Figure 6B:
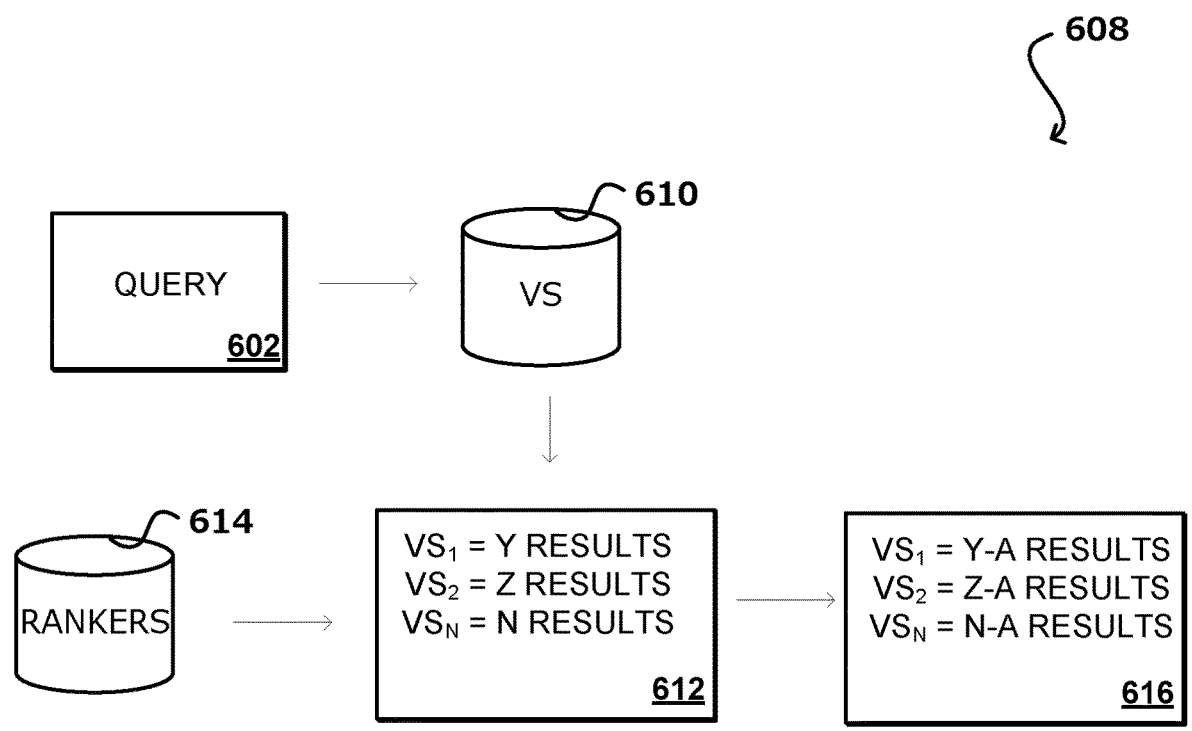
FIG. 6B illustrates an example an environment for implement a search query using virtual shelves, in accordance with embodiments of the present disclosure.

FIG. 6B illustrates an example environment 608 where the broad query 602 is evaluated against a database 610 including potential virtual shelves, as described herein. The virtual shelves may be associated with logical groupings that may be related to the broad query 602. As a result, potential results 612 for various virtual shelves may be less than the X results representative of the search results 606. For example, in the illustrated embodiment of a first virtual shelf ($VS_1$) may have Y potential results, a second virtual shelf ($VS_2$) may have Z potential results, and another virtual shelf ($VS_N$) may have N potential results, with the letters each representing integers. Because the virtual shelves are representative of logical groupings that may exclude certain ASINs, the integers Y, Z, and N are likely smaller than X. As a result, a number of items to sort through is smaller, which provides an improvement for the user at a first level.

However, embodiments of the present disclosure provide further improvements by utilizing self-level searching using one or more rankers 614. The rankers may be intent based, as described above, and may search through the potential results 612 to determine which items to present for each virtual shelf and/or to determine an ordering for the items. Applying the rankers to the virtual shelves may be faster than applying the rankers to the overall results 606 because the integers Y, Z, and N are smaller than X, and as a result, sorting and searching may be completed faster due to the smaller number of entries to search through. Thereafter, finalized results 616 may include Y-A results for $VS_1$, Z-A results for $VS_2$, and Z-A results for $VS_N$, where A is an integer that may decrease a number of results based on the ranker applied to the shelves. Accordingly, improved search results may be presented to users in response to receiving a broad search query.

Figure 7:
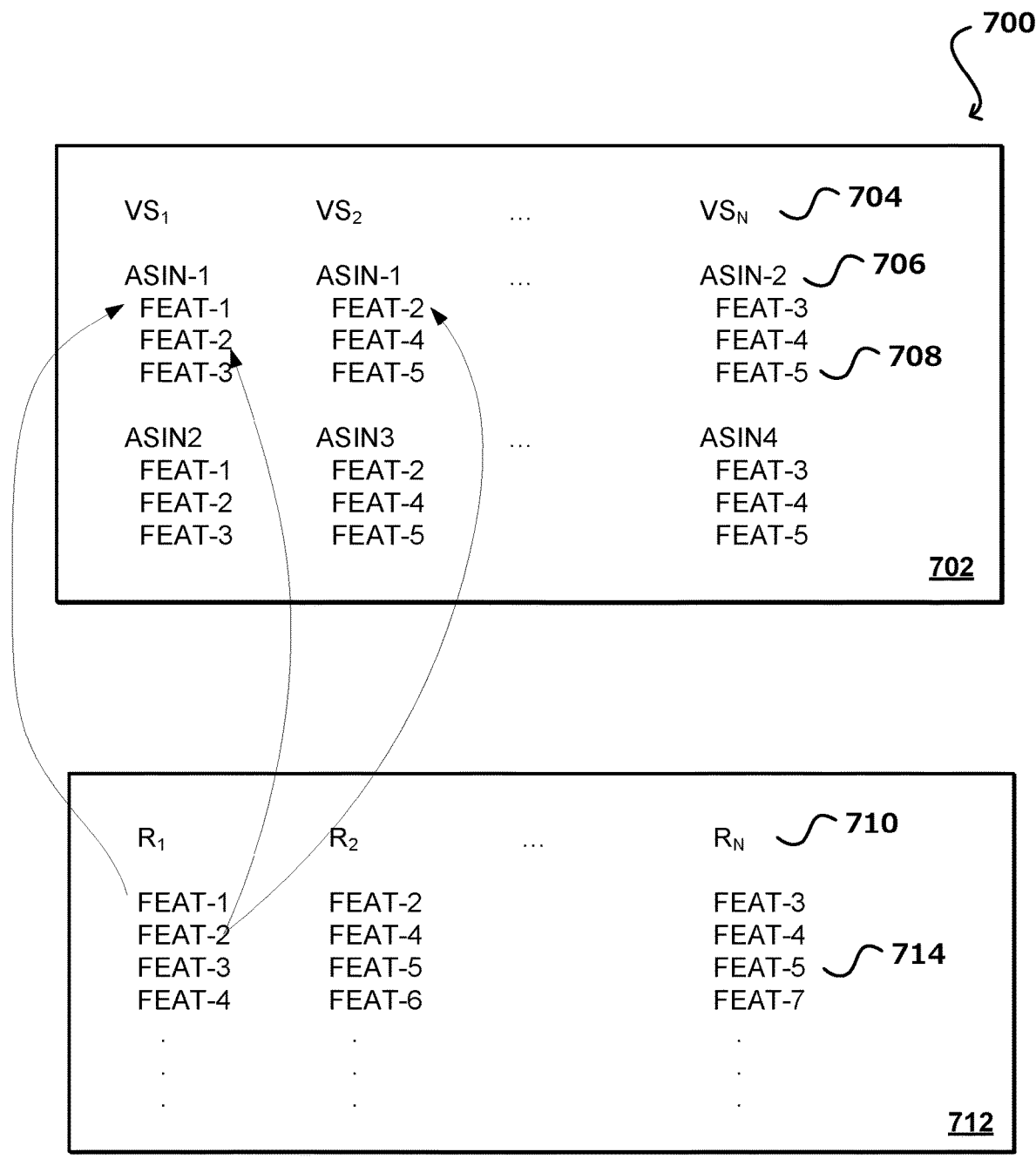
FIG. 7 illustrates an example environment for implementing a self-level searching process, in accordance with embodiments of the present disclosure.

FIG. 7 illustrates an example environment 700 where ASINs (e.g., products) assigned to various virtual shelves (e.g., ASINs that may be potential results responsive to virtual shelves) are evaluated by one or more rankers. In the illustrated embodiment, a table 702 includes a plurality of virtual shelves 704 labeled $VS_1$-$VS_N$. It should be appreciated that the table 702 may include more or fewer virtual shelves than those illustrated in FIG. 7. Each of the virtual shelves has a potential set of results, represented by the ASINs 706. The ASINs may be representative of products that are relevant to a reformulation or property associated with the virtual shelves. As an example, if the first virtual shelf $VS_1$ is a reformulation of a search for "chairs" and is "lawn chairs" the ASIN-1 may correspond to a patio chair and the ASIN-2 may correspond to a hammock. Each of the illustrated ASINs also includes several features 708. The features 708 may describe attributes of the ASIN, such as a product type, material of construction, popularity ranking, brand, user rating, etc. In other words, the features may be representative of data or information to describe the item.

In the illustrated embodiment, one or more rankers 710 may be stored in a database or table 712 and used to perform shelf-level searching and to identify various ASINs for presentation within the virtual shelves. For example, the virtual shelves may include hundreds of potential products, which may be more management than the results from the broad query but still too large for the user to reasonable search. Moreover, the virtual shelf may want to present a small number of products to highlight. As a result, particular products within the virtual shelves may be identified for presentation, with other items being available upon receipt of a request from the user. In various embodiments, the rankers 710 may be particularly selected to identify products corresponding to a user intent, as described above.

In the illustrated embodiment, the rankers 710 each include features 714 that may be compared to the features 708 of the ASINs 706 in order to identify relevant products. For example, a ranker may be directed toward low cost items. As a result, the features may identify products that have a price below a threshold or that have a price a certain percentage lower than other related products, among other potential features. Moreover, certain brands may be associated with low cost items, and as a result, the features may also include those brands. Additionally, for certain products, different materials of construction may also be included. By way of example only, crystal wine glasses will likely be more expensive than plastic wine glasses, and as a result, a low cost ranker may include plastic as a material of construction in order to identify products associated with that ranker.

By way of example in FIG. 7, the features 714 of the rankers 710 may be compared to the features 708 of the ASINs 706. If a sufficient number match (e.g., more than a threshold), the ASINs 706 may be determined to correspond to the ranker. The items that correspond to the particular rankers may be further evaluated, for example for relevance or popularity, in order to determine a final ordering for presentation within the virtual shelves.

As noted above, evaluation of the features is one example of how items may be grouped to clustered based on a user intent. It should be appreciated that, in other embodiments, natural language processing techniques may be used in order to evaluate customer reviews, as an example, to facilitate grouping and ranking. For example, a user may be searching for "summer dress." However, a variety of different dresses may be worn in the summer. Natural language processing may evaluate the reviews for a variety of dresses to determine where they were worn. For example, a user may write a review that includes "I wore this to a summer wedding, it was light and comfortable." As a result, that ASIN may be assigned a feature such as "summer," which may be used with subsequent rankers.

Figure 8:
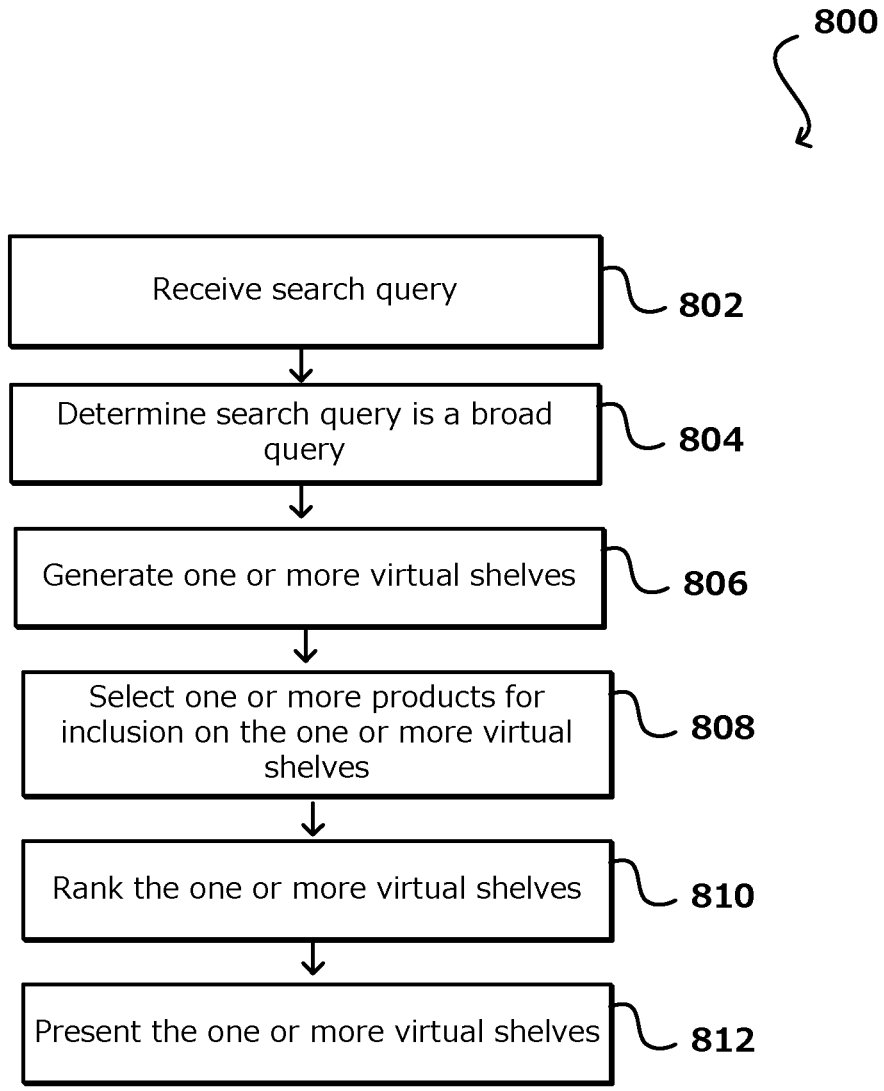
FIG. 8 illustrates an example process of providing one or more virtual shelves in response to a broad query, in accordance with various embodiments of the present disclosure.

FIG. 8 illustrates an example process 800 of recommending items based on objects detected in an image, in accordance with various embodiments. It should be understood that, for any process discussed herein, there can be additional, fewer, or alternative steps performed in similar or alternative orders, or in parallel, within the scope of the various embodiments. In this example, a query may be received 802 from a client device. The query may include a textual search term or multiple terms, a video, an image, audio, or the like. In various embodiments, the query is related to a search in an online marketplace, where the user may wish to look at or purchase one or more products, which may be identified using ASINs or the like.

The search query may be evaluated to determine that the search query is a broad query 804. As noted herein, a broad query may be determined by click entropy, such as determining whether a threshold level is met. A broad query may be related to a search term that is indicative of an exploratory or browsing intent, as opposed to a specific query where a user may know exactly which product they wish to view and/or purchase. Additionally, a broad query may also refer to a search query that results in multiple clicks or reformulations, indicating that the user was exploring a variety of products. As noted above, broad queries may result in search results that lack diversity and/or may include a mix of irrelevant results, which may be frustrating for users. Determination of the broad query may lead to generation of one or more virtual shelves 806. The virtual shelves may correspond to a logical grouping of products, which may share one or more features, such as an object type, a brand, a material of construction, a color, or the like.

In various embodiments, generation of virtual shelves may involve an evaluation of past search histories and/or evaluation of clusters, which may be created by a machine learning system. For example, search histories associated with the broad query may be evaluated to determine how one or more users (or a threshold of users) reformulated their searches. These reformulations may be utilized to generate the virtual shelves, which may group products based on one or more features. In various embodiments, the virtual shelves may be pre-generated, for example for a set of common broad queries, and may be stored in a database. By way of example, the Q-S tables described above may be generated and stored in the database for searching when the broad query is received.

One or more products may be selected for inclusion with the virtual shelves 808. For example, a shelf-level search may be performed to identify the objects for inclusion within the virtual shelves. Searching after generation of the virtual shelves, in various embodiments, may be advantageous because a smaller number of items may be searched, as opposed to a larger set of items that may be related to the initial results of the broad query. The shelf-level search may also incorporate an evaluation of the user's intent. For example, as noted herein, intent may be based on the delineation of the virtual shelves, such as low cost items likely being focused on volume of sales, as opposed to luxury items being focused on user reviews and ratings. A variety of different rankers may also be evaluated to determine which products best fit a user's intent, are responsive to the initial query, and the like. Moreover, in various embodiments, diversity within the virtual shelves may be important to provide a variety of different options for the user. In various embodiments, the selection of the items may be constrained to a predetermined number. Moreover, a subset of the predetermined number (e.g., less than the predetermined number) may be presented on a landing page and may be viewed first. In various embodiments, the selected products may be ranked to determine an ordering within the virtual shelf. Additionally, in various embodiments, sponsored products may also be incorporated and/or integrated into the results.

In various embodiments, the virtual shelves may be ranked 810. Shelf ranking may be evaluated on a shelf-wide level, for example, to determine shelves having items that may be most relevant to the initial query and/or more relevant to the intent of the user. As will be appreciated, the footprint allocated to the virtual shelves may be limited in order to provide a pleasing display for the user, and as a result, a number of virtual shelves selected for presentation may be limited. Upon selection and ranking, the one or more virtual shelves may be presented to the user 812. Presentation may be adjusted based on user device settings, for example, if the user is viewing the results on a mobile device with a small screen. In this manner, the user may receive search results for a variety of different shelves that may logically group a variety of different products. These results may be presented in response to a broad query, thereby enabling the user to browse the results without submitting additional search reformulations.

Figure 9:
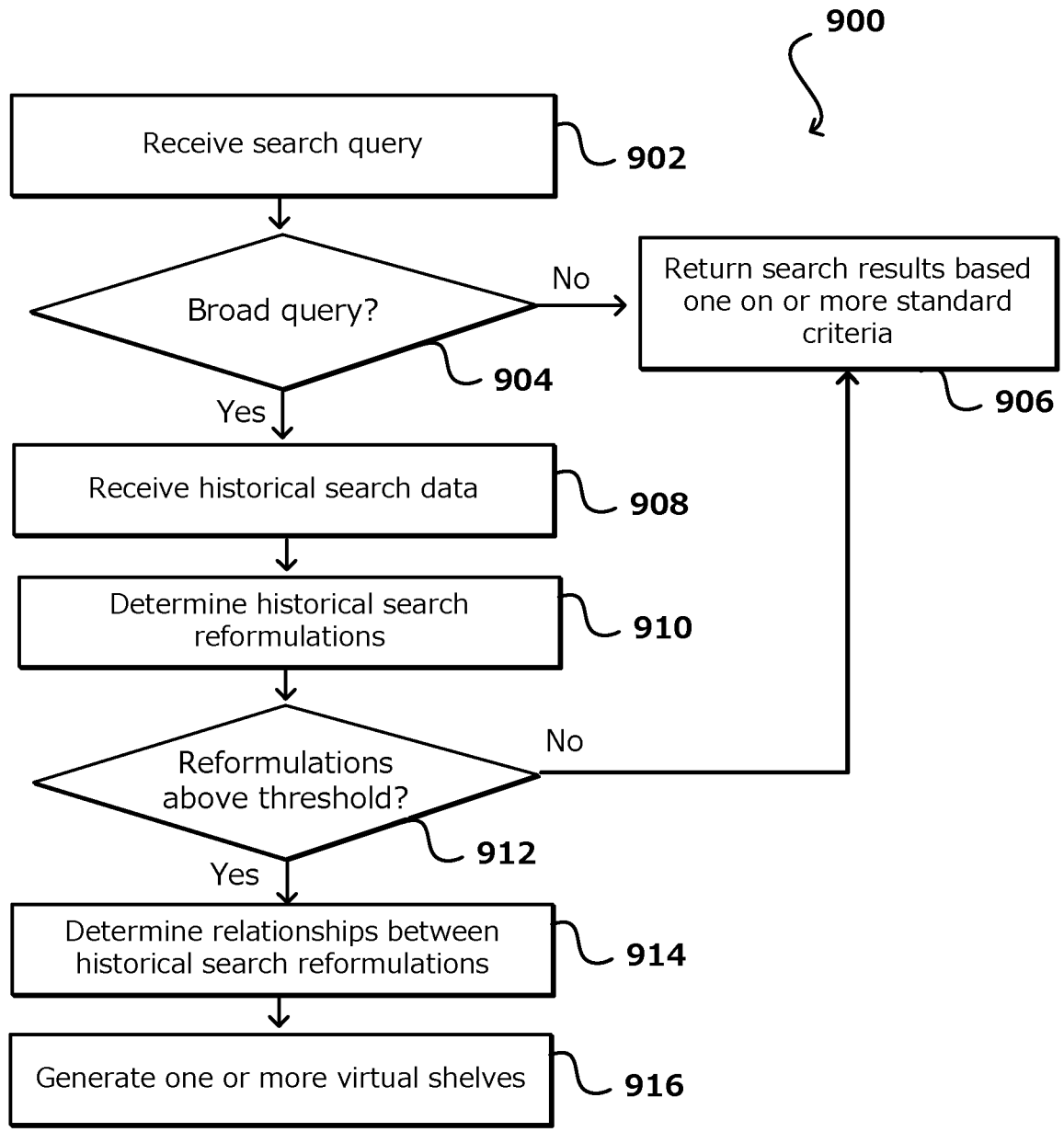
FIG. 9 illustrates an example process for generating one or more virtual shelves, in accordance with various embodiments of the present disclosure.

FIG. 9 illustrates an example process 900 for generating virtual shelves based on historical search reformulations. The example begins with a receiving a search query 902. For example, the search query may be for a product within an online marketplace, as described above. The search query may be evaluated 904 to determine whether the search query is a broad query. A broad query may be defined and/or evaluated, as noted herein, based on an evaluation of click entropy, among other options. A threshold may be established where click entropy values below the threshold may lead to returning search results based on one or more standard criteria 906. It should be appreciated that, in embodiments where the virtual shelves are generated prior to receipt of a search query, for example based on anticipated queries, that determination that the search query is not a broad query may lead to an end of the process 900.

In embodiments where the search query is a broad query, historical search data may be received 908. For example, a database of historical search data may be accessed. The information within the database may be anonymized to remove personal information. In various embodiments, information from the historical search data may include historical search reformulations, for example, a user entering a broad query and then later adjusting the search (e.g., reformulating the search, refining the search, etc.) by entering additional search terms. In various embodiments, the reformulation occurs in at least the search entry box. In other words, more words or phrases are added to the initial search, or in place of the initial search, in order to identify one or more items. These additional reformulations or terms may be identified 910. For example, a list of reformulations may be generated to evaluate what additional search terms were added, and moreover, the searcher's subsequent actions after the reformulation. For example, a reformulation that utilizes additional reformulations may be less informative than a reformulation that leads to a subsequent conversion. The historical search database may include thousands of queries and reformulations, and as a result, the reformulations may be evaluated against a threshold 912. For example, the threshold may be a number of users that performed the same or a similar reformulation. If the reformulation does not exceed the threshold, the search results may be returned by a standard criteria 906, as described above.

Reformulations that exceed the specified threshold may be considered relevant and/or informative for generating one or more virtual shelves. For example, the reformulations may provide information indicative of a user intent and/or inform what categories of products the users evaluate when searching for particular broad topics. In various embodiments, the reformulations themselves may be sufficient to be considered a category and/or a type for a virtual shelf. However, in other embodiments, the reformulations may be evaluated to determine relationships between the respective reformulations 914. For example, reformulations may fall under the same category or feature, such as adding a material or brand name to a particular search, as noted above. Accordingly, the relationship may provide a broader category or grouping for the reformulations, with the individual reformulations being associated with particular shelves. One or more virtual shelves may be generated 916. For example, the virtual shelves may include the individual reformulations or the relationships for the reformulations, as described above.

It should be appreciated that various portions of the process 900 may be performed offline in anticipation of searches. For example, popular broad queries may be identified and various virtual shelves may be generated. In embodiments, the virtual shelves may be stored in Q-S table structures, which may be accessed when a search query is received. Moreover, in other embodiments, the virtual shelves may be evaluated and generated in real or near-real time. Accordingly, users may receive improved search results in response to broad search queries.

Figure 10:
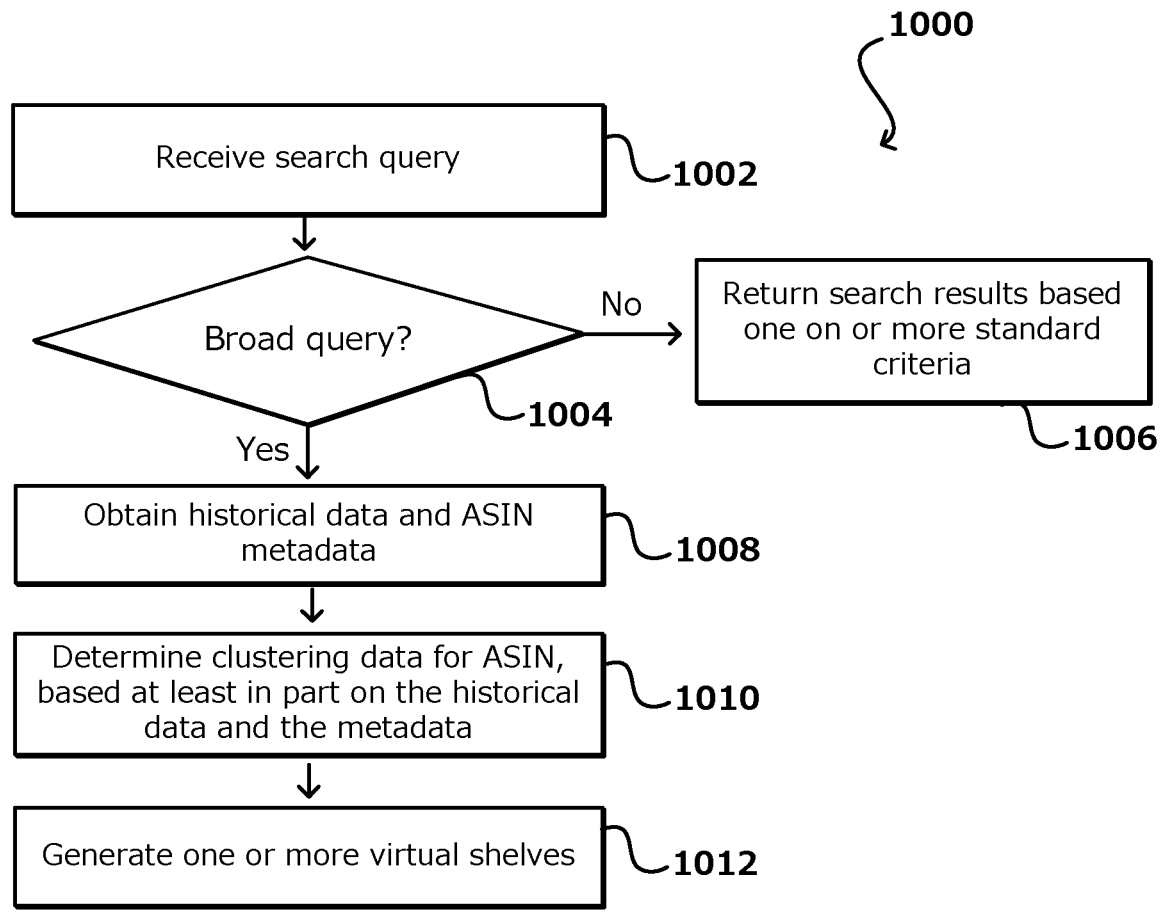
FIG. 10 illustrates an example process for generating one or more virtual shelves, in accordance with various embodiments of the present disclosure.

FIG. 10 illustrates an example process 1000 for generating virtual shelves. The example begins with a receiving a search query 1002. For example, the search query may be for a product within an online marketplace, as described above. The search query may be evaluated 1004 to determine whether the search query is a broad query. A broad query may be defined and/or evaluated, as noted herein, based on an evaluation of click entropy. A threshold may be established where click entropy values below the threshold may lead to returning search results based on one or more standard criteria 1006. It should be appreciated that, in embodiments where the virtual shelves are generated prior to receipt of a search query, for example based on anticipated queries, that determination that the search query is not a broad query may lead to an end of the process 1000.

In embodiments where the search query is a broad query, historical data and ASIN metadata may be obtained 1008. The historical data may be anonymized data related to user behavior in response to submitting the broad query. For example, reformulations may be evaluated, along with user responses to those reformulations (e.g., subsequent user actions). Moreover, ASIN metadata may be analyzed. The ASIN metadata may include information, such as product information, customer reviews, and the like. In various embodiments, the user data, along with the metadata, may be evaluated using natural language processing techniques in order to generate relevant search terms that may be associated with the various ASINs. These features may then be utilized to determine various ASINs related to the generated search terms. As described above, one or more machine learning techniques may be deployed in order to develop the keywords. Thereafter, the products associated with the ASINs may be clustered or grouped 1010. For example, items having similar features may be clustered together. Moreover, items that are responsive to generated keywords may also be clustered. Thereafter, the one or more virtual shelves may be generated 1012. For example, the virtual shelves may utilize the generated keywords to formulate the shelf types and/or the individual shelves. In this manner, a machine learning system may be incorporated to develop the virtual shelves as users continue to interact with the system.

Figure 11:
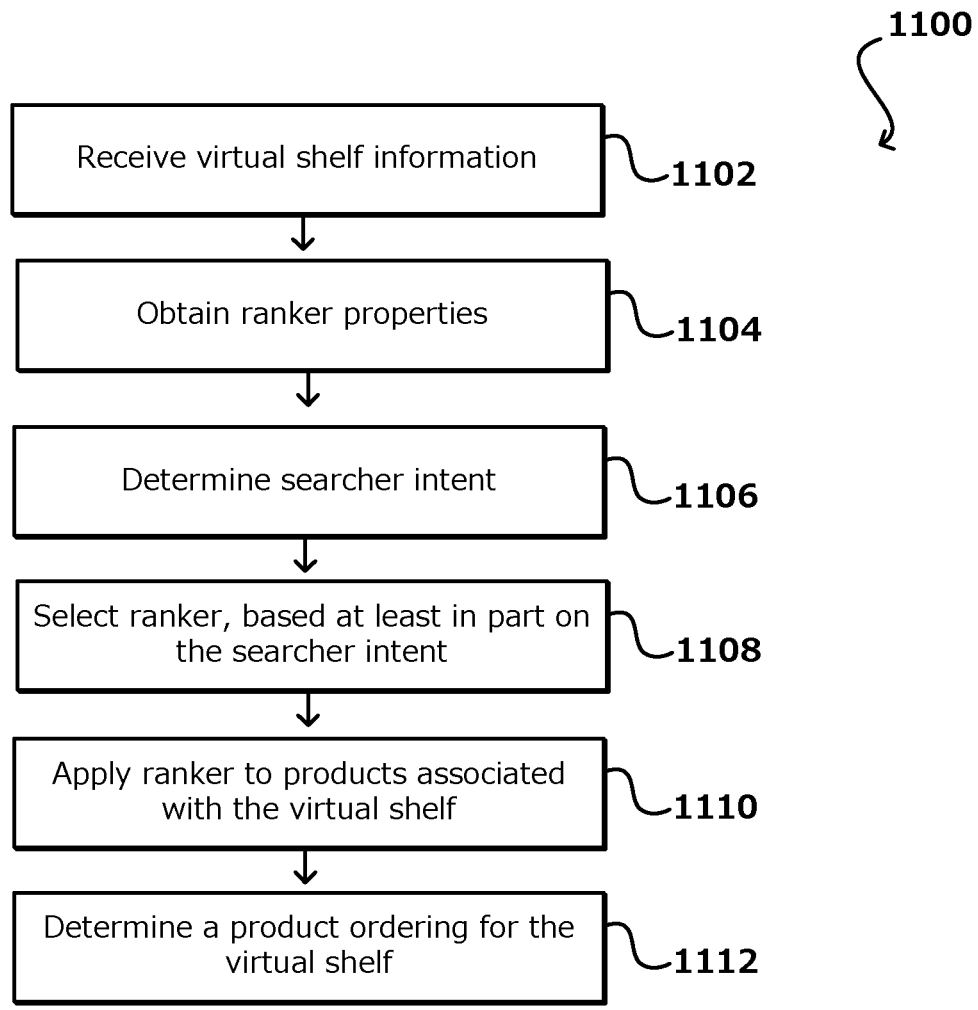
FIG. 11 illustrates an example process for populating one or more virtual shelves, in accordance with various embodiments of the present disclosure.

FIG. 11 illustrates an example process 1100 for conducting shelf-level searching in order to identify products for inclusion within virtual shelves. In the example, virtual shelf information is received 1102. For example, it may be determined that a broad query is received and then virtual shelves may be selected. In various embodiments, a plurality of virtual shelves may be selected. Each of the virtual shelves may include a subset of products that may be associated with the virtual shelves. Additionally, various products may overlap and be included within multiple different virtual shelves. In certain embodiments, the virtual shelves may be selected from a plurality of virtual shelf types. For example, a virtual shelf type, as noted above, may include multiple different virtual shelves within the virtual shelf type.

In various embodiments, a plurality of rankers may be developed that are applied to the virtual shelves in order to select products for the virtual shelves. As noted, the rankers may be stored within a database and may be updated as new information is obtained. Ranker properties may be obtained 1104 and evaluated for the variety of shelves. For example, different rankers may be directed toward a variety of different properties or features. In certain embodiments, a searcher intent may be determined 1106. The virtual shelves, at least in part, may facilitate determination of the searcher intent. For example, a virtual shelf directed toward low cost or high volume items may be indicative of low consideration items. Additionally, in embodiments, a virtual shelf directed toward high cost or luxury items may be indicative of high consideration items. This intent may facilitate identification of a ranker for use with the virtual shelves 1108. For example, a low consideration intent may relate to selection of items having a high purchase rate. In contrast, a high consideration intent may relate to selection of items having high customer reviews or a large number of rankings. In other words, the intent of the searcher may influence which items are included within the various virtual shelves.

The ranker may be applied to the products associated with the virtual shelves 1110. In various embodiments, a subset of the total number of products are initially presented, and upon receipt of instructions from a user, additional products may be presented. As a result, the application of the ranking may determine a product ordering for the virtual shelf 1112. Thereafter, the virtual shelf may be provided to the user.

Figure 12:
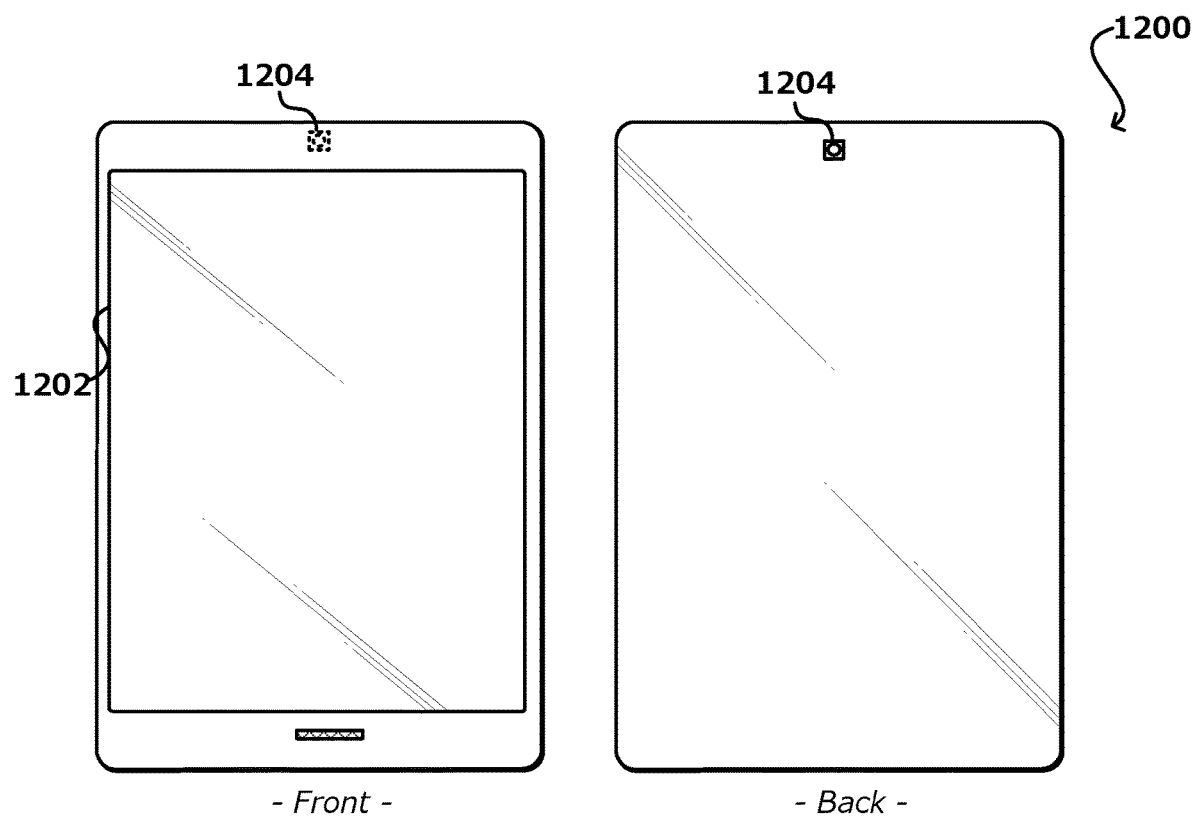
FIG. 12 illustrates an example computing device that can be used, in accordance with various embodiments of the present disclosure.

FIG. 12 illustrates an example computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. In this example, the computing device 1200 has a display screen 1202, which under normal operation will display information to a user facing the display screen (e.g., on the same side of the computing device as the display screen). The computing device in this example can include one or more media capture elements, in this example including one image capture element 1204 on the back side of the device, although it should be understood that image capture elements could also, or alternatively, be placed on the sides or corners of the device, and that there can be any appropriate number of capture elements of similar or different types. Each image capture element 1204 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 13:
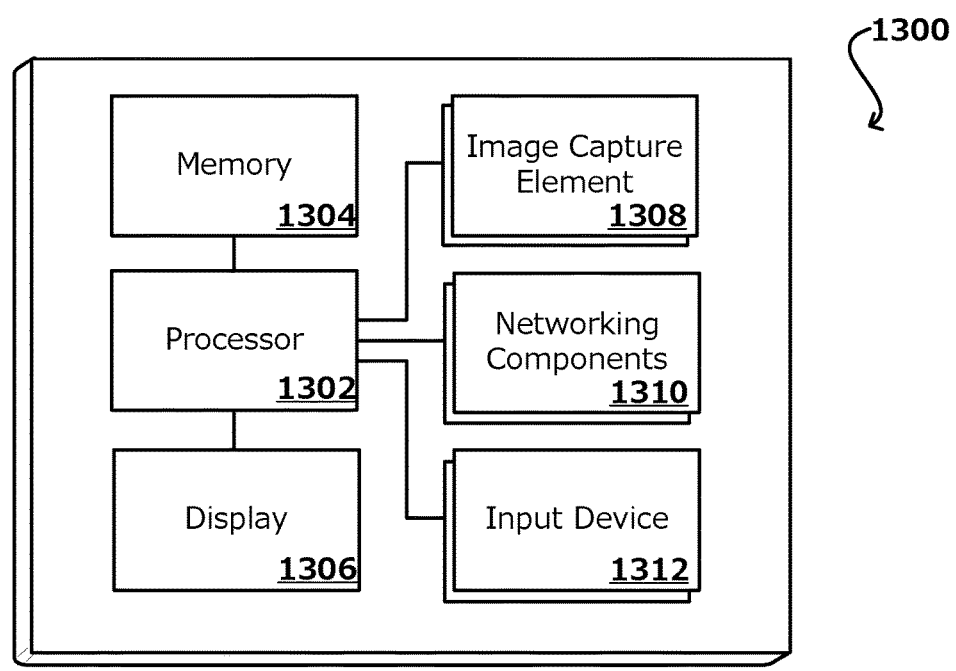
FIG. 13 illustrates a set of example components of one or more devices of the present disclosure, in accordance with various embodiments of the present disclosure.

FIG. 13 illustrates a set of example components of one or more devices 1300 of the present disclosure. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the processor 1302, the same or separate storage can be used for images or data, a removable memory can be available for sharing information with other devices, and any number of communication approaches can be available for sharing with other devices. The device typically will include some type of display element 1306, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1308, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 1310 enabling the device to communicate with remote systems or services such as content providers and rights determining systems. These components can include, for example, wired or wireless communication components operable to communicate over a network such as a cellular network, local area network, or the Internet. The device can also include at least one additional input device 1312 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 14:
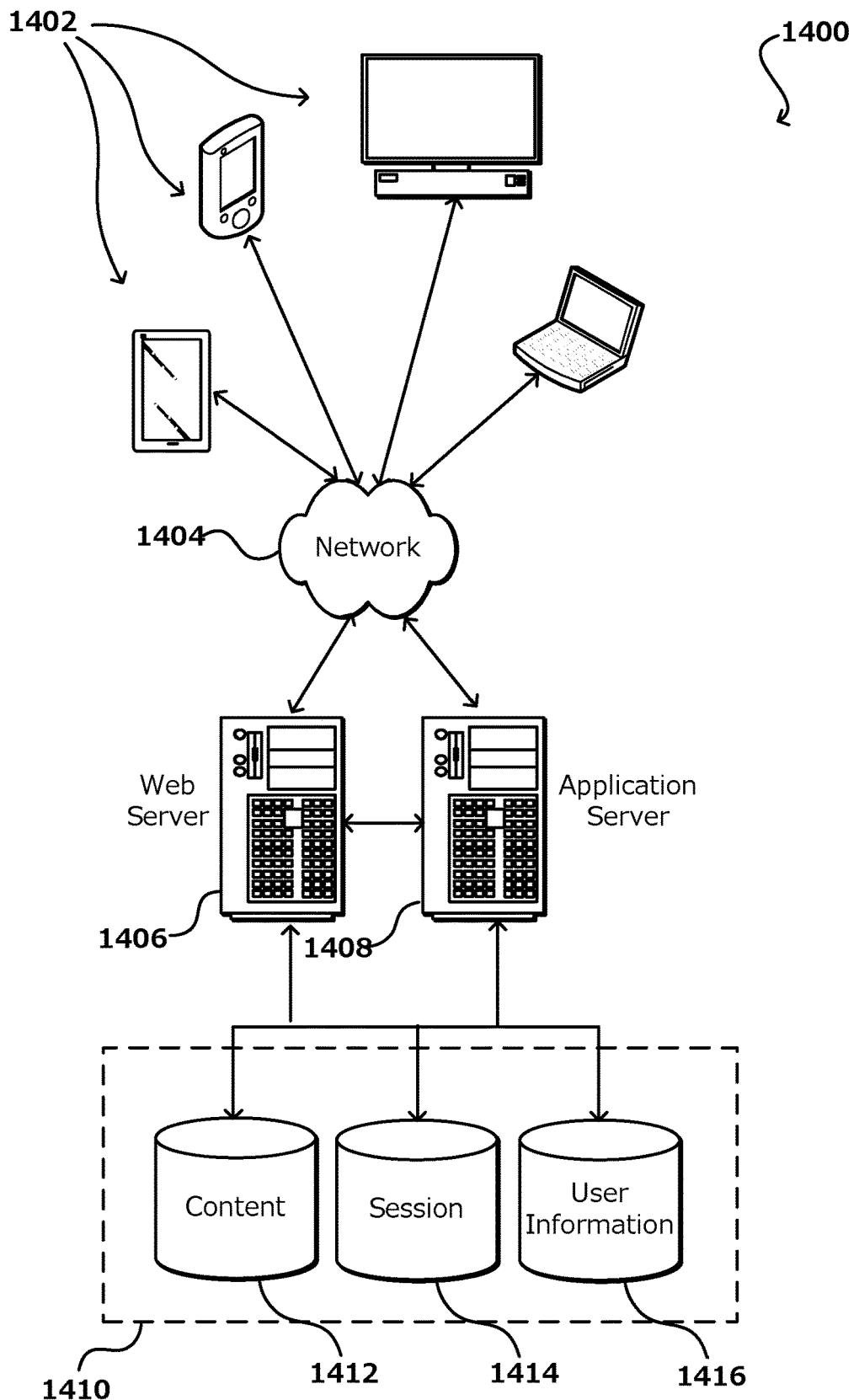
FIG. 14 illustrates an example environment for implementing aspects, in accordance with various embodiments of the present disclosure.

FIG. 14 illustrates an example environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example.

The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein. The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results list on a Web page that the user is able to view via a browser on the user device 1402. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management.

These devices can also include other electronic devices, such as dummy terminals, thin-clients, gaming systems and other devices capable of communicating via a network. Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, in response to a search query, a subset of results associated with the search query, the subset of results being based, at least in part, on a prior reformulation of the search query;
receiving contextual information for the search query;
selecting a ranker, from an available set of rankers, to apply to the subset of results, the ranker evaluating one or more features of the products forming the subset of results, the ranker being selected based at least in part on the contextual information;
applying the ranker to the subset of results, the ranker generating a list of ranker results; and
providing the list of ranker results in response to the search query.

2. The computer-implemented method of claim 1, wherein the contextual information is based at least in part on the subset of results, user search history, or prior historical search history.

3. The computer-implemented method of claim 1, further comprising:
obtaining a feature for each result of the subset of results;
determining the feature corresponds to a search intention; and
selecting the ranker based at least in part on the search intention.

4. The computer-implemented method of claim 1, further comprising:
selecting, based on the ranker, a predetermined number of results for prominent display, the predetermined number based on one or more properties of the ranker.

5. The computer-implemented method of claim 1, further comprising:
obtaining a list of supplemental content;
selecting, based at least in part on the ranker, a subset of the list of supplemental content; and
adding the subset to the list of ranker results.

6. A computer-implemented method, comprising:
determining a list of results, based at least in part on a prior reformulation applied to an initial search query;
searching the list of results, based at least in part on contextual information corresponding to the results, to identify a refined list of results, the refined list of results including fewer products than the list of results;
selecting a number of results, from the refined list of results, for display in response to a search query; and
providing the number of results.

7. The computer-implemented method of claim 6, further comprising:
determining a user intention, the user intention corresponding, at least in part, to the contextual information; and
identifying, from the list of results, one or more products aligned with the user intention.

8. The computer-implemented method of claim 6, wherein the contextual information is based at least in part on the list of results, user search history, or prior historical search history.

9. The computer-implemented method of claim 6, further comprising:
obtaining at least one feature from each product in the list of results;
determining, based at least in part on the respective at least one feature, a user intention.

10. The computer-implemented method of claim 6, wherein the contextual information includes at least a user intention, the user intention corresponding to at least one of low consideration items, high consideration items, low price items, high price items, or readily available items.

11. The computer-implemented method of claim 6, further comprising:
selecting a first ranker, from a database, for filtering the list of results;
selecting a second ranker, from the database, for filtering the list of results;
comparing a first relevance of the first ranker results to a second relevance of the second ranker results;
determining the first relevance is greater than the second relevance; and
selecting the first ranker results.

12. The computer-implemented method of claim 6, further comprising:
receiving user interaction information for the number of results; and
updating one or more parameters of the filtering, based at least in part on the user interaction information.

13. The computer-implemented method of claim 6, further comprising:
selecting, from the number of results, a predetermined number of results for prominent display, the predetermined number being smaller than the number of results.

14. A system, comprising:
at least one processor; and
a memory device including instructions that, when executed by the at least one processor, cause the system to:
determine a list of results based at least in part on a prior reformulation applied to an initial search query;
search the list of results, based at least in part on contextual information corresponding to the results, to identify a refined list of results, the refined list of results including fewer products than the list of results;

select a number of results, from the refined list of results, for display in response to a search query; and provide the number of results.

15. The system of claim 14, wherein the instructions, when executed by the at least one processor, further cause the system to:
   determine a user intention, the user intention corresponding, at least in part, to the contextual information; and
   identify, from the list of results, one or more products aligned with the user intention.

16. The system of claim 14, wherein the instructions, when executed by the at least one processor, further cause the system to:
   obtain at least one feature from each product in the list of results;
   determine, based at least in part on the respective at least one feature, a user intention.

17. The system of claim 14, wherein the instructions, when executed by the at least one processor, further cause the system to:
   select a first ranker, from a database, for filtering the list of results;
   select a second ranker, from the database, for filtering the list of results;
   compare a first relevance of the first ranker results to a second relevance of the second ranker results;
   determine the first relevance is greater than the second relevance; and
   select the first ranker results.

18. The system of claim 14, wherein the instructions, when executed by the at least one processor, further cause the system to:
   receive user interaction information for the number of results; and
   update one or more parameters of the filtering, based at least in part on the user interaction information.

19. The system of claim 14, wherein the instructions, when executed by the at least one processor, further cause the system to:
   select, from the number of results, a predetermined number of results for prominent display, the predetermined number being smaller than the number of results.

20. The system of claim 14, wherein the contextual information is based at least in part on the list of results, user search history, or prior historical search history.

* * * * *